United States Patent
Kato

(10) Patent No.: US 9,690,658 B2
(45) Date of Patent: Jun. 27, 2017

(54) DISTRIBUTED STORAGE SYSTEM AND METHOD

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 14/656,756

(22) Filed: Mar. 13, 2015

(65) Prior Publication Data

US 2015/0278018 A1    Oct. 1, 2015

(30) Foreign Application Priority Data

Mar. 29, 2014    (JP) ................................. 2014-070666

(51) Int. Cl.
*G11C 29/00* (2006.01)
*G06F 11/10* (2006.01)

(52) U.S. Cl.
CPC .. *G06F 11/1076* (2013.01); *G06F 2211/1028* (2013.01)

(58) Field of Classification Search
None
See application file for complete search history.

(56) References Cited

U.S. PATENT DOCUMENTS

| | | | |
|---|---|---|---|
| 8,074,014 B2 | 12/2011 | Narayanan et al. | |
| 9,389,958 B2* | 7/2016 | Sundaram | G06F 3/0689 |
| 2005/0228943 A1* | 10/2005 | DeCenzo | G06F 11/1076 |
| | | | 711/114 |
| 2006/0143418 A1* | 6/2006 | Takahashi | G06F 3/0605 |
| | | | 711/165 |
| 2007/0208921 A1* | 9/2007 | Hosouchi | G06F 1/3203 |
| | | | 711/170 |
| 2008/0126855 A1* | 5/2008 | Higashijima | G06F 11/0727 |
| | | | 714/16 |
| 2009/0193182 A1 | 7/2009 | Nitta | |
| 2010/0313102 A1* | 12/2010 | Chen | G06F 11/1068 |
| | | | 714/773 |
| 2010/0332951 A1* | 12/2010 | Peng | G11C 5/143 |
| | | | 714/773 |
| 2011/0022812 A1* | 1/2011 | van der Linden | G06F 9/5077 |
| | | | 711/163 |
| 2011/0113234 A1* | 5/2011 | Augenstein | G06F 3/0605 |
| | | | 713/150 |

FOREIGN PATENT DOCUMENTS

| | | |
|---|---|---|
| JP | 06-119218 | 4/1994 |
| JP | 2009-181314 | 8/2009 |

* cited by examiner

*Primary Examiner* — M. Mujtaba Chaudry
(74) *Attorney, Agent, or Firm* — Fujitsu Patent Center

(57) ABSTRACT

A distributed storage system includes a plurality of storage devices and an information processing devices including a storage unit that is accessed more preferentially than the plurality of storage devices, and a processor. The processor deletes the data that can be restored from the storage unit when data that belongs to data stored in a first storage device and which can be restored is stored in the storage unit. The processor writes data that belongs to the data stored in the first storage device and which will not be restored to the storage unit. The processor switches the first storage device to the power-off state after writing the data. The processor reads the data that has been stored in the storage unit and which will not be restored when a request to read the data that will not be restored is given.

15 Claims, 19 Drawing Sheets

FIG. 3A

| DATA IDENTIFIER | FIRST DEVICE IDENTIFIER | SECOND DEVICE IDENTIFIER |
|---|---|---|
| d1 | i51 | — |
| d2 | i52 | — |
| d3 | i53 | — |
| d4 | i54 | — |
| d5 | i61 | — |
| d6 | i62 | — |
| d7 | i63 | — |
| d8 | i64 | — |
| d9 | i71 | — |
| ... | ... | ... |
| d23 | i73 | — |
| d24 | i74 | — |
| d25 | i51 | — |
| d26 | i52 | — |
| ... | ... | ... |

FIG. 3B

| DATA IDENTIFIER | FIRST DEVICE IDENTIFIER | SECOND DEVICE IDENTIFIER |
|---|---|---|
| d1 | i51 | i61 |
| d2 | i52 | — |
| d3 | i53 | — |
| d4 | i54 | — |
| d5 | i61 | — |
| d6 | i62 | — |
| d7 | i63 | — |
| d8 | i64 | — |
| d9 | i71 | — |
| ... | ... | ... |
| d23 | i73 | — |
| d24 | i74 | — |
| d25 | i51 | i62 |
| d26 | i52 | — |
| ... | ... | ... |

FIG. 4A

| PARITY IDENTIFIER | DATA IDENTIFIER | THIRD DEVICE IDENTIFIER | FOURTH DEVICE IDENTIFIER |
|---|---|---|---|
| p1 | d1<br>d2<br>d3<br>d4 | i55 | – |
| p2 | d5<br>d6<br>d7<br>d8 | i56 | – |
| p3 | d9<br>d10<br>d11<br>d12 | i65 | – |
| p4 | d13<br>d14<br>d15<br>d16 | i66 | – |
| ... | ... | ... | ... |

FIG. 4B

| PARITY IDENTIFIER | DATA IDENTIFIER | THIRD DEVICE IDENTIFIER | FOURTH DEVICE IDENTIFIER |
|---|---|---|---|
| p1 | d1<br>d2<br>d3<br>d4 | i55 | i71 |
| p2 | d5<br>d6<br>d7<br>d8 | i56 | i51 |
| p3 | d9<br>d10<br>d11<br>d12 | i65 | – |
| p4 | d13<br>d14<br>d15<br>d16 | i66 | i72 |
| ... | ... | ... | ... |

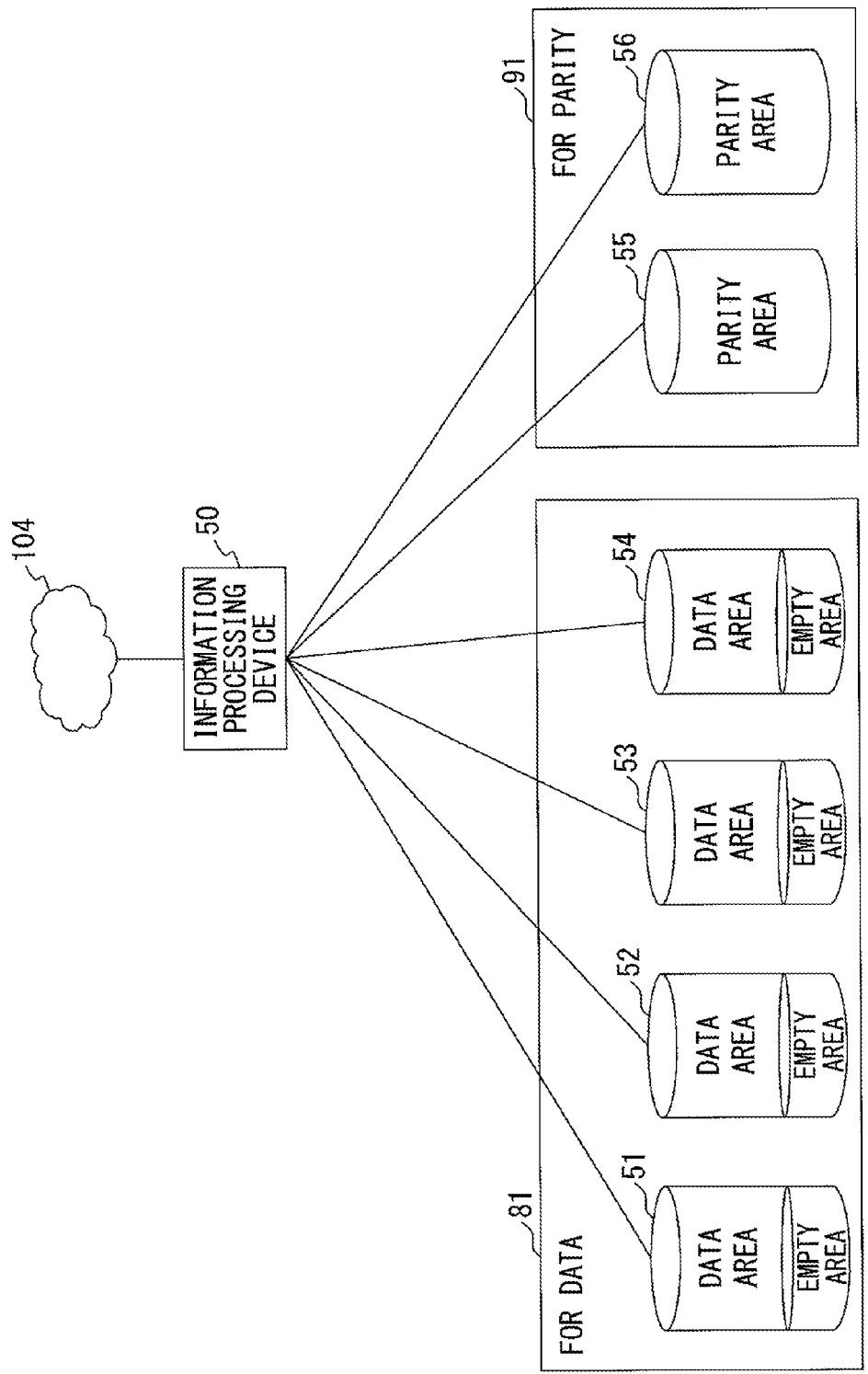

| DATA AREA | | | EMPTY AREA | | | | | 51D |
|---|---|---|---|---|---|---|---|---|
| DATA IDENTIFIER | DATA | TIME | DATA IDENTIFIER | DATA | PARITY IDENTIFIER | PARITY | TIME | |
| d1 | D1 | t1 | – | – | p2 | P2 | t8 | |
| d13 | D13 | t13 | – | – | – | – | – | |
| d25 | D25 | t25 | – | – | – | – | – | |
| d37 | D37 | t37 | – | – | – | – | – | |
| ⋮ | ⋮ | ⋮ | ⋮ | ⋮ | ⋮ | ⋮ | ⋮ | |

| DATA AREA | | | EMPTY AREA | | | | | 52D |
|---|---|---|---|---|---|---|---|---|
| DATA IDENTIFIER | DATA | TIME | DATA IDENTIFIER | DATA | PARITY IDENTIFIER | PARITY | TIME | |
| d2 | D2 | t2 | – | – | – | – | – | |
| d14 | D14 | t14 | – | – | – | – | – | |
| d26 | D26 | t26 | – | – | – | – | – | |
| d38 | D38 | t38 | – | – | – | – | – | |
| ⋮ | ⋮ | ⋮ | ⋮ | ⋮ | ⋮ | ⋮ | ⋮ | |

| DATA AREA | | | EMPTY AREA | | | | | 53D |
|---|---|---|---|---|---|---|---|---|
| DATA IDENTIFIER | DATA | TIME | DATA IDENTIFIER | DATA | PARITY IDENTIFIER | PARITY | TIME | |
| d3 | D3 | t3 | – | – | p8 | P8 | t32 | |
| d15 | D15 | t15 | – | – | – | – | – | |
| d27 | D27 | t27 | – | – | – | – | – | |
| d39 | D39 | t39 | – | – | – | – | – | |
| ⋮ | ⋮ | ⋮ | ⋮ | ⋮ | ⋮ | ⋮ | ⋮ | |

| DATA AREA | | | EMPTY AREA | | | | | 54D |
|---|---|---|---|---|---|---|---|---|
| DATA IDENTIFIER | DATA | TIME | DATA IDENTIFIER | DATA | PARITY IDENTIFIER | PARITY | TIME | |
| d4 | D4 | t4 | d49 | D49 | – | – | t49 | |
| d16 | D16 | t16 | – | – | – | – | – | |
| d28 | D28 | t28 | – | – | – | – | – | |
| d40 | D40 | t40 | – | – | – | – | – | |
| ⋮ | ⋮ | ⋮ | ⋮ | ⋮ | ⋮ | ⋮ | ⋮ | |

| PARITY IDENTIFIER | PARITY | TIME |
|---|---|---|
| p1 | P1 | t4 |
| p7 | P7 | t28 |
| ⋮ | ⋮ | ⋮ |

F I G. 7A

56P

| PARITY IDENTIFIER | PARITY | TIME |
|---|---|---|
| p2 | P2 | t8 |
| p8 | P8 | t32 |
| ⋮ | ⋮ | ⋮ |

| DATA IDENTIFIER | DATA | TIME |
|---|---|---|
| d9 | D9 | t9 |
| d8 | D8 | t8 |
| d32 | D32 | t32 |
| d19 | D19 | t19 |
| d1 | D1 | t1 |
| d7 | D7 | t7 |
| d13 | D13 | t13 |
| d2 | D2 | t2 |
| d28 | D28 | t28 |

FIG. 9B

| DATA IDENTIFIER | DATA | TIME |
|---|---|---|
| d9 | D9 | t9 |
| d8 | D8 | t8 |
| d32 | D32 | t32 |
| d19 | D19 | t19 |
| d7 | D7 | t7 |
| d2 | D2 | t2 |
| d28 | D28 | t28 |

FIG. 9C

| DATA IDENTIFIER | DATA | TIME |
|---|---|---|
| d25 | D25 | t25 |
| d37 | D37 | t37 |
| d9 | D9 | t9 |
| d8 | D8 | t8 |
| d32 | D32 | t32 |
| d19 | D19 | t19 |
| d7 | D7 | t7 |
| d2 | D2 | t2 |
| d28 | D28 | t28 |

| DATA IDENTIFIER | TIME |
|---|---|
| d25 | t25 |
| d37 | t37 |
| d49 | t49 |
| ... | ... |

FIG. 10B — 52r

| DATA IDENTIFIER | TIME |
|---|---|
| d2 | t2 |
| d14 | t14 |
| d26 | t26 |
| ... | ... |

FIG. 10C — 53r

| DATA IDENTIFIER | TIME |
|---|---|
| d3 | t3 |
| d15 | t15 |
| d27 | t27 |
| ... | ... |

FIG. 10D — 54r

| DATA IDENTIFIER | TIME |
|---|---|
| d4 | t4 |
| d16 | t16 |
| d40 | t40 |
| ... | ... |

FIG. 10E — 51r

| DATA IDENTIFIER | TIME |
|---|---|
| d49 | t49 |
| d61 | t61 |
| d73 | t73 |
| ... | ... |

FIG. 10F — 52r

| DATA IDENTIFIER | TIME |
|---|---|
| d2 | t2 |
| d14 | t14 |
| d26 | t26 |
| ... | ... |

FIG. 10G — 53r

| DATA IDENTIFIER | TIME |
|---|---|
| d3 | t3 |
| d15 | t15 |
| d27 | t27 |
| ... | ... |

FIG. 10H — 54r

| DATA IDENTIFIER | TIME |
|---|---|
| d4 | t4 |
| d16 | t16 |
| d40 | t40 |
| ... | ... |

| DATA IDENTIFIER | TIME |
|---|---|
| — | — |
| — | — |
| ... | ... |

FIG. 11A

| DATA IDENTIFIER | TIME |
|---|---|
| d1 | t1 |
| d13 | t13 |
| ... | ... |

FIG. 11B

DISTRIBUTED STORAGE SYSTEM AND METHOD

CROSS-REFERENCE TO RELATED APPLICATION

This application is based upon and claims the benefit of priority of the prior Japanese Patent Application No. 2014-070666, filed on Mar. 29, 2014, the entire contents of which are incorporated herein by reference.

FIELD

The embodiments discussed herein are related to a distributed storage system, a storage device control method, and a non-transitory computer-readable recording medium.

BACKGROUND

In a distributed storage system, erasure coding that makes data redundant by using parity for restoring erased data is used. In the distributed storage system using the erasure coding, when a server stores data in a storage device, parity is generated and the data and parity are distributed and stored in a plurality of storage devices. In the following explanation, a storage device storing data is also referred to as a data storage device. Further, a storage device storing parity is also referred to as a parity storage device.

Then, the server keeps the parity storage device in the power-off state except for during the period of time during which parity is read in order to restore data, and during the period of time during which new parity is written. Due to this, the server reduces the period of time during which the parity storage device is in the power-on state and thus reduces power consumption. In the following explanation, the power-off state is also referred to simply as an off state and the power-on state is also referred to simply as an on state.

Further, when storing data in the data storage device in the case where the parity storage device is in the off state, the server generates new parity and writes the parity in an empty area of the data storage device. Then, when reading parity for data restoration, the server reads the parity stored in the data storage device. Due to this, the server reduces the frequency of reading and writing of parity from and to the parity storage device and thus further reduces the power consumption. When there is no longer an empty area in the data storage device, the server performs processing to bring the parity storage device into the on state and to write the parity stored in the data storage device back to the parity storage device. In the following explanation, as described previously, in the case where the storage device that is the storage destination of data is in the off state, data is stored temporarily in another storage device. Processing to write the data stored in another storage device back to the storage device that is the storage destination of the data when the storage device that is the storage destination of the data enters the on state is also referred to as write off-loading.

As a related technique, a technique as follows is known. The controller determines whether or not the empty capacity of the nonvolatile memory is smaller than a predetermined data size upon receipt of a command from the host device to write data to be written that is stored in the buffer to the hard storage device, and then, in the case where the empty capacity is smaller than the predetermined data size, in order to increase the empty capacity, the controller deletes synchronized data, which is data of the predetermined data stored in the nonvolatile memory, that is identical to that existing on the hard storage device, and the controller writes the data to be written that is stored in the buffer to the nonvolatile memory.

Further, as a related technique, a technique as follows is known. That is, the file device stages a file segment F1-2 of a file F1 on a cache CS and registers the file segment F1-2 to an order lower than that of a file segment F1-1 in an LRU table, and then the file device stages a file segment F2-2 of a file F2 on the cache CS from a storage device DS and registers the file segment F2-2 to an order lower than the file segment F2-1 in the LRU table, and in this manner, the file device registers a file segment closer to the front of the file to a higher order, and thereby the file device makes the probability higher that a file segment closer to the front of the file exists on the cache CS.

Furthermore, a technique as follows is also known. That is, in a storage system, in the case where a predetermined storage device will not be made use of because the power is in the off state or the power is an overloaded state when a request to store data in the predetermined device is received, the data is stored in another storage device, and when the predetermined storage device becomes available again, the data that was stored in the other storage device is acquired and written to the predetermined storage device (e.g., Japanese Laid-open Patent Publication No. 2009-18134, Japanese Laid-open Patent Publication No. 06-119218, and U.S. Pat. No. 8,074,014).

In the distributed storage system that uses the storage device control technique described previously, all the data storage devices are kept in the on state so that the parity storage device is not activated at the time of reading, and therefore, there is a problem wherein it is not possible to reduce the power consumption of the data storage device.

SUMMARY

According to an aspect of the embodiments, a distributed storage system includes a plurality of storage devices and a plurality of information processing devices. The information processing device includes a storage unit that is accessed more preferentially than the plurality of storage devices, and a processor. In the case where data that belongs to the data stored in a first storage device and which can be restored by using data and parity that have been distributed and stored in another storage device that is in the power-on state is stored in the storage unit, the processor deletes the data that can be restored from the storage unit. The processor writes data that belongs to the data stored in the first storage device and which will not be restored by using data and parity that have been distributed and stored in another storage device that is in the power-on state to the storage unit. Further, the processor switches the first storage device to the power-off state after writing the data that will not be restored to the storage unit. Then, when a request to read the data that will not be restored is given in the case where the first storage device is in the power-off state, the processor reads the data that has been stored in the storage unit and which will not be restored.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A and FIG. 3B are diagrams illustrating an example of data management information;

FIG. 4A and FIG. 4B are diagrams illustrating an example of parity management information;

FIG. 5 is a diagram illustrating an example of a storage device;

FIG. 6 is a diagram illustrating an example of stored information stored in a data storage device;

FIG. 7A and FIG. 7B are diagrams showing an example of stored information stored in a parity storage device;

FIG. 9A, FIG. 9B, and FIG. 9C are diagrams illustrating an example of held information;

FIG. 10A to FIG. 10H are diagrams illustrating an example of history information;

FIG. 11A and FIG. 11B are diagrams illustrating an example of off-load information;

DESCRIPTION OF EMBODIMENTS

A distributed storage system of embodiments is explained.

Figure 1:
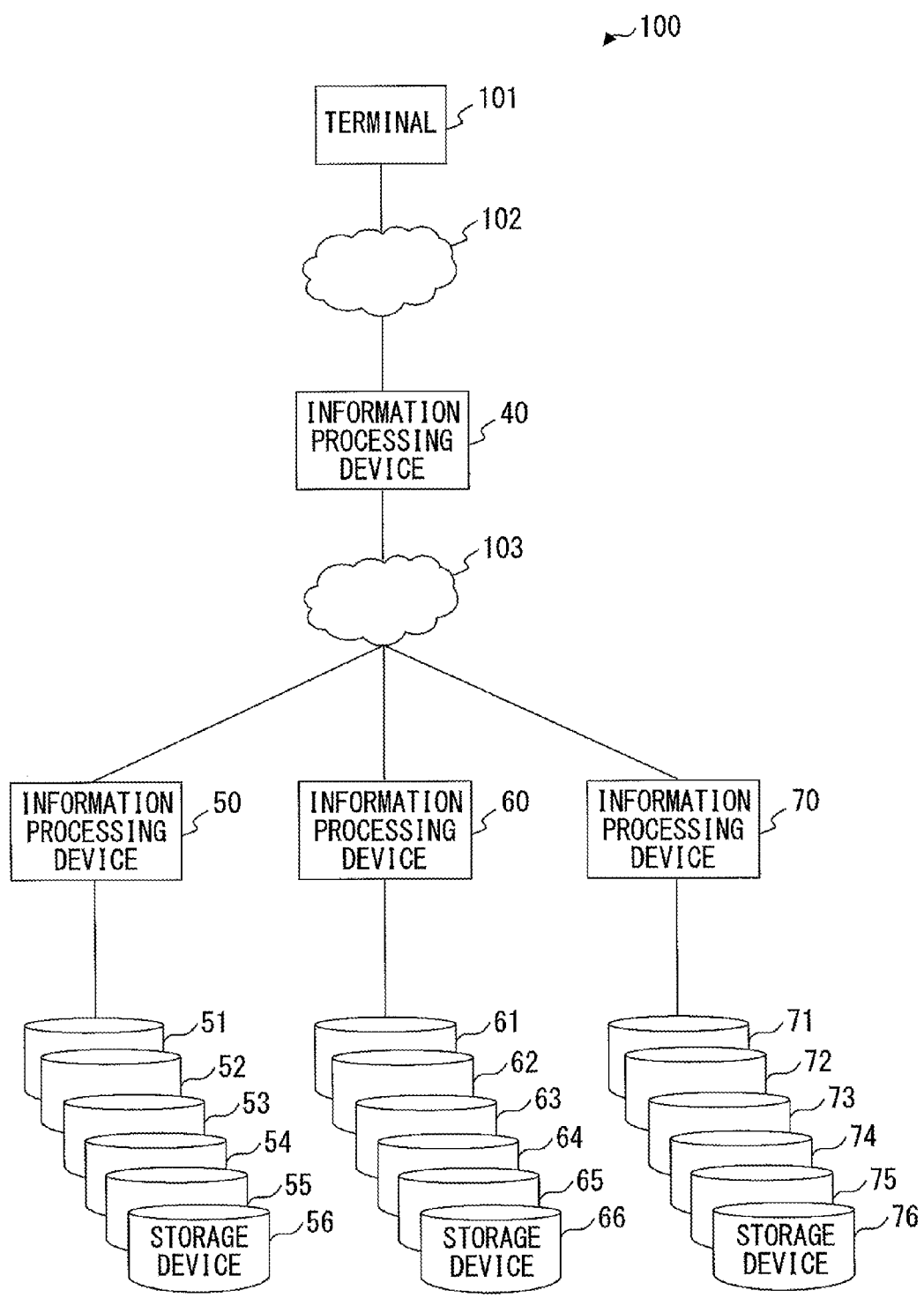
FIG. 1 is a diagram illustrating one embodiment of a distributed storage system.

FIG. 1 is a block diagram illustrating one embodiment of a distributed storage system.

With reference to FIG. 1, a configuration of a distributed storage system is explained.

A distributed storage system 100 includes, for example, a terminal 101, networks 102 and 103, an information processing device 40, an information processing device 50, an information processing device 60, and an information processing device 70. In the following explanation, the information processing device 40, the information processing device 50, the information processing device 60, and the information processing device 70 are also referred to as the information processing devices 40 to 70. Further, the information processing device 50, the information processing device 60, and the information processing device 70 are also referred to as the information processing devices 50 to 70.

The terminal 101 is connected to the information processing device 40 via, for example, the network 102 so as to be capable of communication. The information processing devices 40 to 70 are connected to one another via, for example, the network 103 so as to be capable of communication.

The information processing device 50 is connected to, for example, storage devices 51 to 56 so as to be capable of communication. The information processing device 60 is connected to, for example, storage devices 61 to 66 so as to be capable of communication. The information processing device 70 is connected to, for example, storage devices 71 to 76 so as to be capable of communication. In the following explanation, the storage devices 51 to 56, the storage devices 61 to 66, and the storage devices 71 to 76 are each also referred to as a storage device 1 when they are not distinguished from one another in particular. Further, a device being connected to another device so as to be capable of communication is also expressed as a device being connected to another device communicatively, or expressed simply as a device being connected to another device.

The terminal 101 transmits, for example, data write requests and data read requests that are made by an input from a user, by processing of software, etc., to the information processing device 40. The terminal 101 is, for example, a computer device, to be described later. In the following explanation, explanation is given on the assumption that the data write request includes data that is written. When the data write request and the data read request are not distinguished from each other in particular, the data write request and the data read request are each also referred to simply as a request.

Figure 2:
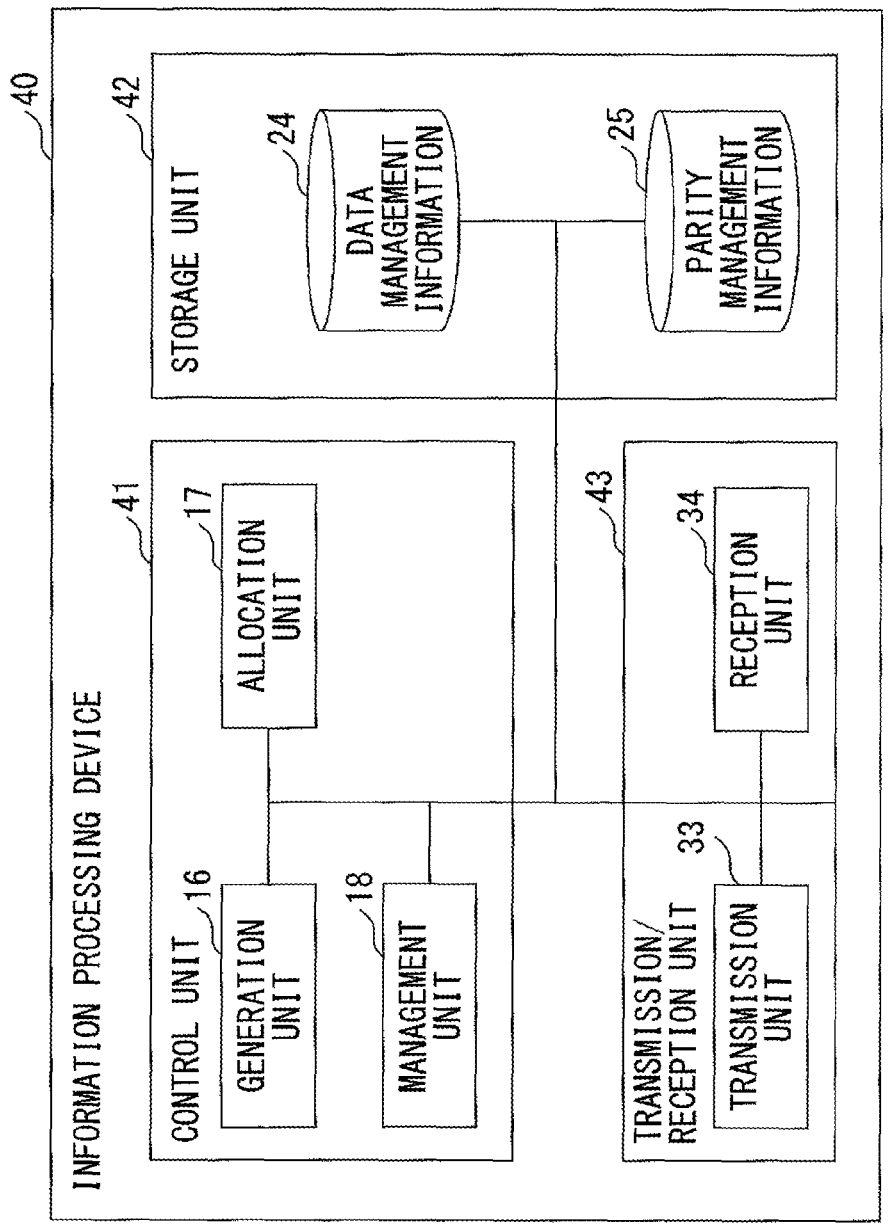
FIG. 2 is a functional block diagram (part 1) illustrating one embodiment of an information processing device.

FIG. 2 is a functional block diagram (part 1) illustrating one embodiment of the information processing device. With reference to FIG. 20, the information processing device 40 is explained.

The information processing device 40 includes a control unit 41, a storage unit 42, and a transmission/reception unit 43. The control unit 41 includes, for example, a generation unit 16, an allocation unit 17, and a management unit 18. The storage unit 42 stores, for example, data management information 24 and parity management information 25. The transmission/reception unit 43 includes, for example, a transmission unit 33 and a reception unit 34. The information processing device 40 is, for example, a computer device, to be described later. The information processing device 40 may be, for example, an IA server (Intel Architecture server).

The information processing devices 50 to 70 may include one or more of the generation unit 16, the allocation unit 17, and the management unit 18 included in the control unit 41 of the information processing device 40, to be described below. Further, the information processing devices 50 to 70 may include one or more of the data management information 24 and the parity management information 25 stored in the storage unit 42 of the information processing device 40.

When a write request is given by the terminal 101, the generation unit 16 acquires data from the storage devices 1 in a predetermined number and generates parity by using the data included in a write request that has been given and the acquired data. Then, the generation unit 16 generates a parity write request including the generated parity. It may also be possible for the generation unit 16 to generate parity by finding an exclusive OR of a plurality of pieces of data, or to generate parity by using a predetermined algorithm proposed in the erasure coding when generating parity.

The allocation unit 17 allocates the requests given by the terminal 101 and the transfer destinations of the parity write requests generated by the generation unit 16 to the information processing devices 50 to 70. At this time, the allocation unit 17 may allocate the requests equally to the information processing devices 50 to 70. Further, in the case where the information processing devices 50 to 70 have different throughput capacities, the allocation unit 17 may make the number of requests that are allocated to the information processing device having a high throughput capacity larger than the number of requests that are allocated to the information processing device having a low throughput capacity. In this manner, the allocation unit 17 has the functioning of a load balancer.

When a data write request is given by, for example, the terminal 101, the allocation unit 17 specifies the storage device 1 that stores the data included in the data write request. Then, the allocation unit 17 transfers the data write request to the information processing device connected to the specified storage device 1.

Further, when a write request to update the data stored in the storage device 1 is given by, for example, the terminal 101, the allocation unit 17 specifies the storage device 1 and transfers the write request to update the data to the information processing device to which the data write request before the transmission has been allocated. In the following explanation, the write request to update data is also referred to as a data update request. Further, it is assumed that the data update request includes data for updating.

Furthermore, in the case where the storage device 1 storing the data before updating is in the off state when a data update request is given by, for example, the terminal 101, the allocation unit 17 specifies another storage device 1 in the on state. Then, the allocation unit 17 transfers a data write request to store the data for updating in the empty area of the other storage device 1 to the information processing device connected to the other storage device 1 that has been specified. In the following explanation, the data write request to store the data for updating in the empty area of the other storage device 1 is also referred to as a data off-load request. It is assumed that the data off-load request includes data that is off-loaded. To off-load data means to store data in the empty area of the other storage device 1, not of the storage device 1 storing the data before updating.

In the case where the generation unit 16 generates a parity write request when a data write request is given by the terminal 101, the allocation unit 17 specifies the parity storage device 1 for storing the parity. Then, the allocation unit 17 transfers the parity write request to the information processing device connected to the specified parity storage device 1. In the following explanation, it is assumed that the parity write request includes parity.

In the case where the generation unit 16 generates parity when a data update request is given by the terminal 101, the allocation unit 17 transfers a write request to update the parity to the information processing device connected to the storage device 1 specified the previous time. In the following explanation, the write request to update parity is also referred to as a parity update request. Further, it is assumed that the parity update request includes parity for updating.

Furthermore, for example, in the case where the storage device 1 storing the parity before updating is in the off state when the generation unit 16 generates a parity update request, the allocation unit 17 specifies another storage device 1 in the on state. Then, the allocation unit 17 transfers the parity update request to store the parity for updating in the empty area of the storage device 1 to the information processing device connected to the other specified storage device 1.

In the following explanation, the parity write request to store the parity for updating in the empty area of the other storage device 1 is also referred to as a parity off-load request. Further, it is assumed that the parity off-load request includes the parity that is off-loaded. The parity that is off-loaded refers to the parity that is stored in the empty area of the other data storage device 1, not the storage device 1 storing the parity before updating. The storage device 1 storing the parity before updating refers to, for example, the parity storage device 1. To off-load parity means to store parity in the empty area of the other data storage device 1, not the parity storage device 1 for storing parity.

The management unit 18 stores information that associates information for identifying the storage device 1 specified by the allocation unit 17 and information for identifying the data stored in the storage device 1 with each other in the data management information 24.

Further, the management unit 18 stores information that associates information for identifying the storage device 1 specified by the allocation unit 17 and information for identifying the parity stored in the storage device 1 with each other in the parity management information 25.

Explanation is given with reference to FIG. 3.

FIG. 3 is a diagram illustrating an example of data management information. With reference to FIG. 3, the data management information 24 is explained.

In the data management information 24, for example, data identifiers, first device identifiers, and second device identifiers are stored in association with one another, as illustrated in FIG. 3A.

The data identifier is information for identifying data. The data identifier may be, for example, a data name. As a data identifier, it may also be possible for the management unit 18 to acquire the identifier of data that is stored in the storage device 1 and to store the identifier in the data management information 24 when the allocation unit 17 allocates a data write request to the storage device 1.

The first device identifier is, for example, information for identifying the data storage device 1 for storing data that is identified by the data identifier belonging to the same record. The storage device 1 for storing data may be, for example, the storage device 1 that has been specified first by the allocation unit 17 as the storage destination of the data that is identified by the data identifier. Further, the storage device 1 for storing data may be the storage device 1 that has been specified by a user. Then, as a first device identifier, for example, it may also be possible for the management unit 18 to acquire the identification information of the storage device 1 that has stored data first and to store the identification information in the data management information 24. In the following explanation, explanation is given on the assumption that the storage device 1 for storing data is the data storage device 1 that has been specified first by the allocation unit 17 as the storage destination of data.

Further, it is assumed that identifiers i51 to i56 correspond to the storage devices 51 to 56, respectively, illustrated in FIG. 1. Then, it is also assumed that identifiers i61 to i66 correspond to the storage devices 61 to 66, respectively, illustrated in FIG. 1. Further, it is also assumed that identifiers i71 to i76 correspond to the storage devices 71 to 76, respectively, illustrated in FIG. 1. Then, it is also assumed that the storage devices 51 to 54, the storage devices 61 to 64, and the storage devices 71 to 74 are the data storage devices. Further, it is also assumed that the storage devices 55 and 56, the storage devices 65 and 66, and the storage devices 75 and 76 are the parity storage devices.

The second device identifier is, for example, information for identifying another storage device 1 in the on state specified by the allocation unit 17 in order to store the data for updating in the empty area thereof in the case where the storage device 1 identified by the first device identifier is in the off state. Then, as a second device identifier, for example, it may also be possible for the management unit 18 to acquire the identification information of another storage device 1 in the on state that is storing the data for updating and to store the identification information in the data management information 24 when the allocation unit 17 allocates the storage destination of the data for updating to the other storage device 1 that is in the on state. The second device identifier is deleted by the management unit 18 after the data is written from the storage device 1 identified by the second device identifier back to the storage device 1 identified by the first device identifier belonging to the same record. Here, the other storage device 1 in the on state is the data storage device 1.

With reference to the data management information 24 illustrated in FIG. 3A and FIG. 3B, information indicated by the record stored in the data management information 24 is explained in detail.

The data management information 24 indicates that data D1 identified by a data identifier d1 is stored in the storage device 51 identified by the first device identifier in the case where the data identifier d1 and the first device identifier i51 are stored in association with each other, for example, as illustrated in FIG. 3A. In the following explanation, explanation is given on the assumption that a data identifier dx identifies data Dx.

The data management information 24 indicates that the storage device 51 identified by the first device identifier is in the off state in the case where the data identifier d1, the first device identifier i51, and the second device identifier i61 are stored in association with one another, for example, as illustrated in FIG. 3B. Further, the data management information 24 indicates that the data D1 identified by the data identifier d1 is stored in the storage device 61 in the case where, for example, the data identifier d1, the first device identifier i51, and the second device identifier i61 are stored in association with one another.

An example of processing in which the data management information 24 is updated from the state in FIG. 3A into the state in FIG. 3B is explained.

When a data write request is given in the case where, for example, the storage device 51 is in the on state, the allocation unit 17 causes the storage device 51 for storing data to store the data D1 identified by the data identifier d1. Then, the management unit 18 associates the data identifier d1 and the first device identifier i51 that identifies the storage device 51 with each other and stores them in the data management information 24, as illustrated in FIG. 3A.

Next, when a request to update data that is identified by the data identifier d1 is given in the case where, for example, the storage device 51 is in the off state, the allocation unit 17 causes another storage device 61 to store the data that is identified by the data identifier d1. Then, the management unit 18 associates the data identifier d1 and the second device identifier i61 that identifies the other storage device 61 with each other and stores them in the data management information 24, as illustrated in FIG. 3B.

Further, the management unit 18 deletes the second device identifier i61 from the data management information 24 after the data D1 is written from the storage device 1 that is identified by the second device identifier i61 back to the storage device 1 that is identified by the first device identifier i51. At this time, the information stored in the data management information 24 changes, for example, from the state in FIG. 3B into the state in FIG. 3A.

By the above, the information processing device 40 manages which of the storage devices 1 the most recent data of the data that is identified by each data identifier is stored in.

Explanation is given with reference to FIG. 4.

FIG. 4 is a diagram illustrating an example of parity management information.

In the parity management information 25, for example, parity identifiers, data identifiers, third device identifiers, and fourth device identifiers are stored in association with one another, as illustrated in FIG. 4A.

The parity identifier is information for identifying parity. The parity identifier may be acquired by the management unit 18 referring to the parity and may be stored in the parity management information 25 when the allocation unit 17 allocates parity to the storage device 1.

The data identifier is information for identifying data. For example, the management unit 18 associates the data identifiers of a plurality of pieces of data used by the generation unit 16 to generate parity and the parity identifiers of the generated parity with each other and stores them in the parity management information 25.

The third device identifier is, for example, information for identifying the parity storage device 1 for storing parity that is identified by the parity identifier belonging to the same record. The storage device 1 for storing parity may be, for example, the storage device 1 that has been specified first by the allocation unit 17 as the storage destination of parity. Further, the storage device 1 for storing parity may be the storage device 1 that has been specified by a user. Then, as a third device identifier, it may also be possible for the management unit 18 to acquire identification information of the storage device 1 that has stored parity first and then to store the identification information in the parity management information 25. In the following explanation, explanation is given on the assumption that the storage device 1 for storing parity is the parity storage device 1 that has been specified first by the allocation unit 17 as the storage destination of parity.

The fourth device identifier is, for example, information for identifying another storage device 1 in the on state that has been specified by the allocation unit 17 in order to store the parity for updating in the empty area thereof in the case where the parity storage device 1 that is identified by the third device identifier is in the off state. Then, as a fourth device identifier, it may also be possible for the management unit 18 to acquire identification information of another storage device 1 in the on state that is storing the parity for updating and to store the identification information in the parity management information 25 when, for example, the allocation unit 17 allocates the storage destination of the parity for updating to the other storage device 1 that is in the on state. Further, the fourth device identifier is deleted by the management unit 18 after the data is written from the storage device 1 that is identified by the fourth device identifier back to the storage device 1 that is identified by the third device identifier belonging to the same record.

With reference to the parity management information 25 illustrated in FIG. 4A and FIG. 4B, information indicated by the record stored in the parity management information 25 is explained in detail.

The parity management information 25 indicates that parity P1 is used as a parity of data D1 to D4 in the case where a parity identifier p1 and data identifiers d1 to d4 are stored in association with each other, as illustrated in FIG. 4A. The parity management information 25 indicates that it is possible to restore the erased data Dx by using the parity P illustrated in FIG. 4A even if any one of the data D1 to D4 is erased. In the following explanation, explanation is given on the assumption that a parity identifier px identifies parity Px.

The parity management information 25 indicates that the parity storage device 1 for storing the parity P1 is the storage device 55 in the case where the parity identifier p1 and the third device identifier i55 are stored in association with each other, as illustrated in FIG. 4A.

The parity management information 25 indicates that the storage device 55 is in the off state and the parity P1 is stored in the storage device 71 in the case where the parity identifier p1, the third device identifier i55, and the fourth device identifier i71 are stored in association with one another, as illustrated in FIG. 4B.

An example of processing in which the parity management information 25 is updated from the state in FIG. 4A into the state in FIG. 4B is explained.

The generation unit 16 generates the parity P1 that is identified by the parity identifier p1 by using the data D1 to D4 that are identified by the data identifiers d1 to d4. After the generation unit 16 generates the parity P1, the management unit 18 associates the data identifiers d1 to d4 of the data D1 to D4 that have been used by the generation unit 16 to generate the parity P1 and the parity identifier p1 with each other and stores them in the parity management information 25, as illustrated in FIG. 4A.

When a parity write request is given in the case where, for example, the storage device 55 is in the on state, the allocation unit 17 causes the storage device 55 for storing parity to store the parity P1 that is identified by the parity identifier p1. Then, the management unit 18 associates the parity identifier p1 and the third device identifier i55 that identifies the storage device 55 with each other and stores them in the parity management information 25, as illustrated in FIG. 4A.

Next, when a request to update the parity that is identified by the parity identifier p1 is given in the case where, for example, the storage device 55 is in the off state, the allocation unit 17 causes another storage device 71 to store the parity that is identified by the parity identifier p1. Then, the management unit 18 associates the parity identifier p1 and the fourth device identifier i71 that identifies the other storage device 71 with each other and stores them in the parity management information 25 as illustrated in FIG. 4B.

By the above, the information processing device 40 manages which of the storage devices 1 the most recent parity of the parity that is identified by each parity identifier is stored in.

Explanation is given with reference to FIG. 2.

The transmission unit 33, for example, transmits data, parity, and requests output from the control unit 41 to the terminal 101 and the information processing devices 50 to 70.

The reception unit 34, for example, receives data, parity, and requests transmitted from the terminal 101 and the information processing devices 50 to 70. Then, the reception unit 34 inputs the received data, parity, and requests to the control unit 41.

Explanation is given with reference to FIG. 5.

FIG. 5 is a diagram illustrating an example of the storage device. FIG. 5 is a diagram illustrating the storage devices 51 to 56 connected to the information processing device 50. The storage devices 61 to 66 connected to the information processing device 60 and the storage devices 71 to 76 connected to the information processing device 70 have the same configuration as that of the storage devices 51 to 56 connected to the information processing device 50, and therefore, explanation is omitted.

The storage devices 51 to 56 are each, for example, a magnetic disc, such as an HDD (Hard Disk Drive), or a drive that uses a semiconductor element memory such as an SSD (Solid State Drive).

The storage devices 51 to 54 are included in a data storage device group 81. The data storage devices 51 to 54 each include a data area for storing data and an empty area.

In the data area, for example, data included in a data write request given by the information processing device 40 is stored.

In the empty area, in the case where the data storage device 1 for storing data is in the off state, data included in a data update request given by the information processing device 40 is stored. Further, in the empty area, in the case where the parity storage device 1 for storing parity is in the off state, parity included in a parity update request given by the information processing device 40 is stored. It may also be possible to set an upper limit to the capacity of the empty area for storing data and parity.

Explanation is given with reference to FIG. 6.

FIG. 6 is a diagram illustrating an example of stored information stored in the data storage device. With reference to FIG. 6, stored information that is stored in the data storage device is explained.

Each piece of stored information 51D to 54D indicates information stored in the storage devices 51 to 54.

In the data area, data identifiers, data, and times are stored in association with one another.

The data identifier is information for identifying data.

The data is data that is identified by the data identifier belonging to the same record of the data area.

The time indicates the last time at which the data that is identified by the data identifier included in the same record was stored in the data area of the data storage device 1. In the case where the data has not been updated, the last time at which the data was stored the last time indicates, for example, the first time at which the data was stored in the storage device 1. In the case where the data has been updated, the last time at which the data was stored the last time indicates, for example, the time at which the data was updated.

In the empty area, data identifiers, data, and times, or parity identifiers, parity, and times are stored in association with one another.

The data identifier is information for identifying data.

The data is data that is identified by the data identifier belonging to the same record in the empty area.

The parity identifier is information for identifying parity.

The parity is parity that is identified by the parity identifier belonging to the same record in the empty area.

The time indicates the last time at which the data that is identified by the data identifier included in the same record was stored in the empty area of the data storage device 1 in the case where the data identifier and the data are associated with each other. In the case where the data has not been updated, the last time at which the data was stored indicates, for example, the first time at which the data was stored for the first time in the storage device 1. In the case where the data has been updated, the last time at which the data was stored indicates, for example, the last time at which the data was updated.

The time indicates the last time at which the parity that is identified by the parity identifier included in the same record was stored in the parity storage device 1 in the case where the parity identifier and the parity are associated with each other. The time at which the parity was stored the last time indicates, for example, the time at which the parity was stored for the first time in the storage device 1 in the case where the parity has not been updated. The time at which the parity was stored the last time indicates, for example, the time at which the parity stored in the storage device 1 was updated in the case where the parity has been updated.

With reference to the stored information 51D to 54D in FIG. 6, information indicated by the record stored in the stored information 51D to 54D is explained in detail.

The stored information of the data storage device 1 indicates that the data D1 that is identified by the data identifier d1 is stored in the data area of the storage device 51 in the case where the data identifier d1 and the data D1 are stored in association with each other, as illustrated in the data area of the stored information 51D.

Further, the stored information of the data storage device 1 indicates that the data D1 or the data D1 for updating was stored at time t1 in the data area of the storage device 51 in the case where the data D1 and the time t1 are stored in association with each other, as illustrated in the data area of the stored information 51D.

The stored information of the data storage device 1 indicates that the parity P2 that is identified by a parity identifier p2 is stored in the empty area of the storage device 51 in the case where the parity identifier p2 and the parity P2 are stored in association with each other, as illustrated in the empty area of the stored information 51D.

Further, the stored information of the data storage device 1 indicates that the parity P2 or the parity P2 for updating was stored at time t8 in the empty area of the storage device 51 in the case where the parity P2 and the time t8 are stored in association with each other, as illustrated in the empty area of the stored information 51D.

The stored information of the data storage device 1 indicates that the data D49 that is identified by a data identifier d49 is stored in the empty area of the storage device 54 in the case where the data identifier d49 and the data D49 are stored in association with each other, as illustrated in the empty area of the stored information 54D.

The stored information of the data storage device 1 indicates that the data D49 or the data D49 for updating was stored at time t49 in the empty area of the storage device 54 in the case where the data D49 and the time t49 are stored in association with each other, as illustrated in the empty area of the stored information 54D.

Explanation is given with reference to FIG. 5.

The storage devices 55 and 56 are, for example, included in a parity storage device group 91. The storage devices 55 and 56 each include a parity area for storing parity. Further, the parity storage devices 55 and 56 are kept in the off state by the information processing device 50 except for the period of time during which parity is read for restoring data, the period of time during which new parity is written, and the period of time during which parity is written back from another storage device 1. The parity storage device 1 may include an empty area.

Explanation is given with reference to FIG. 7.

FIG. 7 is a diagram illustrating an example of stored information of the parity storage device. Each of the pieces of stored information 55P and 56P illustrates information stored in the parity areas of the storage devices 55 and 56, respectively.

In the parity area, parity identifiers, parity, and times are stored in association with one another.

The parity identifier is information for identifying parity.

The parity is parity that is identified by the parity identifier belonging to the same record.

The time indicates the last time at which the parity that is identified by the parity identifier belonging to the same record was stored in the parity storage device 1. In the case where the parity has not been updated, the time at which the parity was stored the last time indicates, for example, the first time at which the parity was stored in the storage device 1. In the case where the parity has been updated, the time at which the parity was stored the last time indicates, for example, the last time at which the parity stored in the storage device 1 was updated.

With reference to the stored information 55P and 56P in FIG. 7, information indicated by the record stored in the stored information 55P and 56P is explained in detail.

The stored information of the parity storage device 1 indicates that the parity P1 that is identified by the parity identifier p1 is stored in the storage device 55 in the case where the parity identifier p1 and the parity P1 are stored in association with each other, as illustrated in the stored information 55P in FIG. 7A.

Further, the stored information of the parity storage device 1 indicates that the parity P1 was stored at time t4 in the storage device 55 in the case where the parity P1 and the time t4 are stored in association with each other, as illustrated in the stored information 55P in FIG. 7A.

Figure 8:
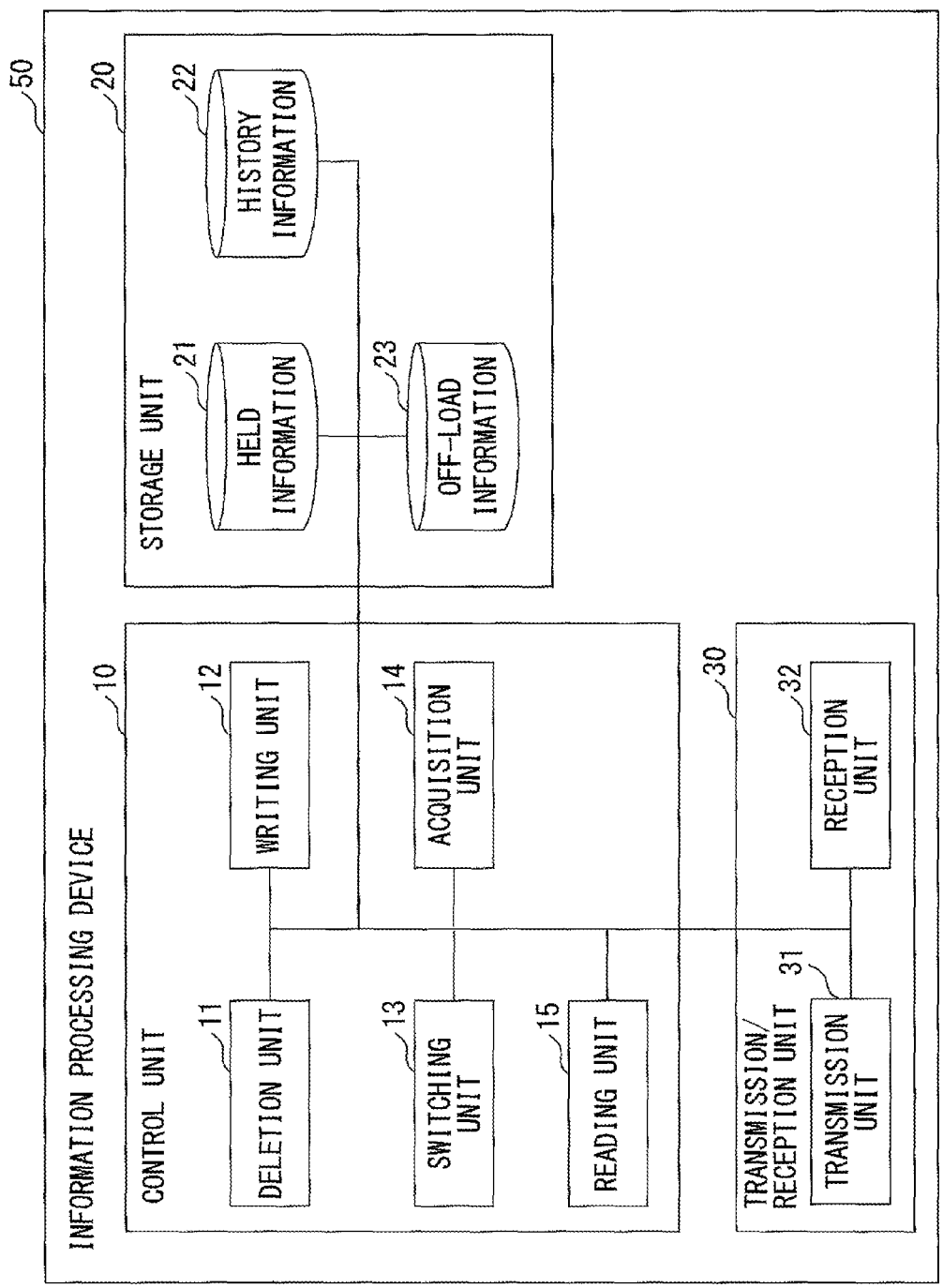
FIG. 8 is a functional block diagram (part 2) illustrating one embodiment of the information processing device.

Explanation is given with reference to FIG. 8.

FIG. 8 is a functional block diagram (part 2) illustrating one embodiment of the information processing device. With reference to FIG. 8, the information processing device 50 is explained. The information processing devices 60 and 70 have the same configuration as that of the information processing device 50, and therefore, explanation is omitted. In the following explanation, each component of the information processing device 50 is explained by using processing to switch between the on state and the off state of the data storage device 51 and processing to write the parity p1 stored in the empty area of the data storage device 71 back to the parity storage device 55 as examples. It is assumed that the parity storage device 1 is kept in the off state so as to reduce power consumption. In other words, it is assumed that the parity storage device 1 that is identified by the third device identifier illustrated in FIG. 4B is in the off state.

The information processing device 50 includes, for example, a control unit 10, a storage unit 20, and a transmission/reception unit 30. The control unit 10 includes a deletion unit 11, a writing unit 12, a switching unit 13, an acquisition unit 14, and a reading unit 15. The storage unit 20 stores held information 21, history information 22, and off-load information 23. The transmission/reception unit 30 includes a transmission unit 31 and a reception unit 32. The information processing device 50 is, for example, a computer device, to be described later. Further, the information processing device 50 may be, for example, an IA server.

The information processing device 50 starts processing to switch the storage device 51 to the off state when, for example, a request to bring the storage device 51 into the off state is given by a user, or in the case where an algorithm has determined that the storage device 51 is to be brought into the off state. The algorithm may be processing to determine that storage device 1 having, among the data storage devices 1, a low access frequency is to be brought into the off state in the case where, for example, the parity storage device 1 is in the off state.

When bringing the first storage device into the off state, the deletion unit 11 determines whether or not data that belongs to the data stored in the first storage device and which can be restored by using the data and parity that were distributed and stored in the other storage device 1 that is in the on state is stored in the held information 21 of the storage unit 20. Then, in the case where the data that can be restored by using the data and parity that were distributed and stored in the other storage device 1 that is in the on state is stored in the storage unit 20, the deletion unit 11 deletes the data that can be restored from the storage unit 20. Here, the first storage device is, for example, the storage device 51. Further, the other storage device 1 that is in the on state is, for example, one of the storage devices 52 to 54, the storage devices 61 to 64, and the storage devices 71 to 74. In the following explanation, the data that can be restored by using the data and parity that were distributed and stored in the other storage device 1 that is in the on state is also referred to as off-loaded data.

The deletion unit 11 determines whether or not there is off-loaded data in the first storage device by, for example, making an inquiry to the management unit 18. Upon receipt of the inquiry about whether or not there is off-loaded data from the deletion unit 11, the management unit 18, for example, refers to the data management information 24 illustrated in FIG. 3A and searches the data stored in the storage device 51. The management unit 18 refers to the parity management information 25 illustrated in FIG. 4B and extracts the data associated with the fourth device identifier from the data stored in the storage device 51 that has been searched. Then, it may also be possible for the management unit 18 to notify the deletion unit 11 of the data identification information of the extracted data. Due to this, it is possible for the deletion unit 11 to determine that the data that is identified by the data identification information is off-loaded data. The management unit 18 notifies the deletion unit 11 of the data identifier d1 as one piece of the off-loaded data in the case where, for example, the parity management information 25 illustrated in FIG. 4B is stored in the storage unit 42 of the information processing device 40.

After data that will not be restored is written to another storage device 1 that is in the on state, the deletion unit 11 deletes the data before updating that has been stored in the storage unit 20 and which will not be restored. It may also be possible for the deletion unit 11 to determine that the data that will not be restored has been written to the other storage device 1 that is in the on state if it is reported by the management unit 18 that the data that will not be restored has been written to the other storage device 1 that is in the on state. When data is written to the other storage device 1, it may also be possible for the management unit 18 to refer to the parity management information 25 and to determine that the written data is data that will not be restored in the case where the written data and the second device identifier are not stored in the associated state, and to notify the deletion unit 11 of that.

The deletion unit 11 deletes the parity stored in the other storage device 1 that is in the on state after the second storage device enters the on state, the parity stored in the other storage device 1 that is in the on state is written back to the second storage device, and the second storage device is switched to the off state. Here, the second storage device is, for example, the parity storage device 1. The writing unit 12 writes the parity P1 stored in the storage device 71 back to the storage device 55 after the storage device enters the on state in the case where, for example, the parity management information 25 illustrated in FIG. 4B is stored in the storage unit 42. Then, it may also be possible for the deletion unit 11 to delete the parity P1 stored in the storage device 71.

After the first storage device enters the on state, the deletion unit 11 searches for the data that is included in the data stored in the first storage device and which will not be restored from the held information 21 stored in the storage unit 20 and deletes the data that has been searched for and which will not be restored from the held information 21.

It may also be possible for the deletion unit 11 to determine the data that is included in the data stored in the first storage device and which will not be restored by making an inquiry to the management unit 18. Upon receipt of the inquiry about the data that is stored in the first storage device and which will not be restored from the deletion unit 11, the management unit 18 refers to the parity management information 25 and searches for data that is not associated with the fourth device identifier among the data stored in the first storage device. Further, it may also be possible for the management unit 18 to refer to the data management information 24, to extract data that is not associated with the second device identifier from the data that has been searched for, and to determine that the extracted data is the data that will not be restored. Then, the management unit 18 may notify the deletion unit 11 of the extracted data.

After the first storage device enters the power-on state, if data that is stored in the other storage device in the power-on state and which will not be restored is written to the first storage device, the deletion unit 11 deletes the data that is stored in the other storage device in the power-on state and which will not be restored.

The writing unit 12 writes to the storage unit 20 the data that belongs to the data stored in the first storage device and which will not be restored even if the data and parity that were distributed and stored in the other storage device 1 that is in the on state are used. When writing the data that will not be restored to the storage device 20, the writing unit 12 writes to the storage unit 20 data whose possibility of being used is high.

Further, when a write request to update the data stored in the first storage device is given in the state where the first storage device is in the off state, the writing unit 12 writes the data included in the write request to the other storage device 1 in the on state.

The writing unit 12 writes to the storage unit 20 data having a high possibility of being used from among the data stored in the storage device 1 that is in the on state after the data that has been stored in the storage unit 20 and which will not be restored is deleted.

After the deletion unit 11 deletes the data that can be restored from the held information 21 of the storage unit 20, the writing unit 12 writes the data identifier of the data that can be restored to the off-load information 23 of the storage unit 20.

Further, when writing the parity back from the other storage device 1 having the parity stored to the second storage device, the writing unit 12 writes the data that can be restored by using the parity and data acquired by the acquisition unit 14 to the storage unit 20. Because of this, it is possible for the reading unit 15 to read the data that can be restored from the storage unit 20 even when the second storage device enters the off state after writing the parity back to the second storage device.

After the first storage device enters the on state, the wiring unit 12 writes the data that has been stored in the first storage device stored in the storage unit 20 and which will not be restored back to the first storage device. Then, the writing unit 12 writes to the storage unit 20 data having a high possibility of being used from among the data stored in the storage device 1 that is in the on state after the deletion unit 11 deletes the data that will not be restored from the storage unit 20.

When the first storage device is brought into the off state, the switching unit 13 switches the first storage device to the power-off state after the writing unit 12 writes the data that will not be restored to the storage unit 20.

After the second storage device enters the on state and the writing unit 12 writes the parity stored in the other storage device 1 in the on state to the second storage device, the switching unit 13 switches the second storage device to the off state.

When a request to read data that can be restored is given in the case where the first storage device is in the off state, the acquisition unit 14 acquires the data that can be restored by using the data and parity that were distributed and stored in the other storage device 1 that is in the on state. It may also be possible for the acquisition unit 14 to acquire the data and parity for restoring the data that can be restored by, for example, making an inquiry about the data and parity for restoring the data that can be restored to the management unit 18. Upon receipt of the inquiry about the data and parity for restoring the data that can be restored from the acquisition unit 14, the management unit 18, for example, refers to the parity management information 25 and searches for the data identifier and the parity identifier associated with the data identifier of the data that can be restored. Further, the management unit 18 refers to the data management information 24 and acquires the data and parity from the storage device 1 associated with the data identifier and the parity identifier that have been searched for. Then, it may also be possible for the management unit 18 to transmit the acquired data and parity to the acquisition unit 14.

Further, when the second storage device enters the on state in the case where the first storage unit is in the off state, the acquisition unit 14 acquires the data that is identified by the data identifier stored in the off-load information 23 of the storage unit 20 and which can be restored. Then, the writing unit 12 writes the data that has been acquired by the acquisition unit 14 and which can be restored to the held information 21 of the storage unit 20. Because of this, it is possible for the reading unit 15 to read the data that can be restored from the held information 21 of the storage unit 20 even if the second storage device enters the off state after the second storage device enters the on state and the writing unit 12 writes the parity back to the second storage unit.

When a request to read the data that will not be restored is given in the case where the first storage device is in the off state, the reading unit 15 reads the data that has been stored in the held information 21 of the storage unit 20 and which will not be restored.

When a request to read the data that can be restored is given in the state where the first storage device is in the off state, the reading unit 15 reads the data acquired by the acquisition unit by using the data and parity that were distributed and stored in the other storage device 1 that is in the on state.

When a request to read the data that will not be restored is given in the case where the first storage device is in the off state and the data that will not be restored has been written to the other storage device 1, the reading unit 15 reads the data that has been stored in the other storage device 1 and which will not be restored.

When a request to write data or a request to read data is given by the information processing device 40, the storage unit 20 is accessed more preferentially than the storage device 1 is. The storage unit 20 is, for example, a cache.

Explanation is given with reference to FIG. 9.

FIG. 9 is a diagram illustrating an example of held information. With reference to FIG. 9, the held information 21 is explained.

The held information 21 stores data whose possibility of being accessed is high. Then, the held information is information that is accessed preferentially when a read request is given to the information processing device 50 by the terminal 101. The data that is stored in the held information 21 may be stored, for example, in the order from the data that has been accessed the most recently by a write request or a read request.

In the held information, data identifiers, data, and times are stored in association with one another.

The data identifier is information for identifying data.

The data is data that is identified by the data identifier belonging to the same record.

The time indicates the last time at which the data that is identified by the data identifier included in the same record was stored in the storage device 1. In the case where the data has not been updated, the last time at which the data was stored indicates, for example, the first time at which the data was stored in the storage device 1. In the case where the data has been updated, the last time at which the data was stored indicates, for example, the last time at which the data was updated.

With reference to the held information 21 illustrated in FIG. 9A, information indicated by the record stored in the held information 21 is explained in detail.

The held information 21 indicates that data D9 that is identified by a data identifier d9 is stored in the storage unit 20 in the case where the data identifier d9 and the data D9 are stored in association with each other, as illustrated in FIG. 9A.

Further, the held information 21 indicates that the data D9 was stored at time t9 in the storage device 1 in the case where the data D9 and the time t9 are stored in association with each other, as illustrated in FIG. 9A.

An example of processing by which the state of the held information 21 in FIG. 9A is updated into the state in FIG. 9B or into the state in FIG. 9C when the storage device 51 enters the on state is explained. In the following explanation, it is assumed that up to nine pieces of data can be stored in the held information 21.

The deletion unit 11 deletes the data D1 and data D13 stored in the storage device 51 from the held information 21 after, for example, the storage device 51 enters the on state, as illustrated in FIG. 9B. In other words, the deletion unit 11 deletes the record in which the data D1 and the data D13 are stored, which is indicated by the thick frame in FIG. 9A, and bring the data storage state of the held information 21 into the state in FIG. 9B.

Then, the writing unit 12 refers to, for example, the history information 22 of the storage devices 1 that are in the on state and that include the storage device 51 and writes data in the order from the data that has been deleted from the held information 21 the most recently, as indicated by the thick frame in FIG. 9C.

Explanation is given with reference to FIG. 10.

FIG. 10 is a diagram illustrating an example of history information. With reference to FIG. 10, the history information 22 is explained.

The history information 22 stores a history of data that can no longer be stored in the held information 21. The data that can no longer be stored in the held information 21 is, for example, the data that was deleted from the held information 21 when the amount of data that can be stored in the storage area for storing the held information 21 reached an upper limit. The history information 22 is provided for each storage device 1. The data that is stored in the history information 22 may be stored in the order from the data that has been stored in the history information 22 the most recently. In the following explanation, the record stored in the history information 22 is also referred to as a deletion history. When deleting data from the held information, it may also be possible for the information processing device 50 to delete data in the order from, for example, the data whose time of being accessed is the oldest among the data stored in the held information 21.

In the history information 22, data identifiers and times are stored in association with each other.

The data identifier is information for identifying data.

The time indicates the time at which the data identifier belonging to the same record was stored in the history information 22.

With reference to the history information 22 illustrated in FIG. 10A, information indicated by the record stored in the history information 22 is explained in detail.

The history information 22 indicates that data D25 was stored at time t25 in the history information 22 in the case where a data identifier d25 and the time 25 are stored in association with each other, as illustrated in FIG. 10A.

Processing when data of the storage device 51 is stored in the held information 21 is explained with reference to FIGS. 10A to 10H.

FIGS. 10A and 10E are the history information 22 of the storage device 51. FIGS. 10B and 10F are the history information 22 of the storage device 52. FIGS. 10C and 10G are the history information 22 of the storage device 53. FIGS. 10D and 10H are the history information 22 of the storage device 54.

When a storage area corresponding to two pieces of data in the held information 21 is produced as in FIG. 9B, the writing unit 12 refers to FIGS. 10A to 10D and extracts two pieces of data with recent times. For example, when extracting t25 and t37 as recent times, the writing unit 12 writes the data D25 and data D37 that are identified by d25 and d37 to the held information 21. Then, the deletion unit 11 deletes the records including d25 and d37 from the history information 22 of the storage device 51, as illustrated in FIG. 10E.

Explanation is given with reference to FIG. 11.

FIG. 11 is a diagram illustrating an example of the off-load information. With reference to FIG. 11, the off-load information 23 is explained.

In the off-load information 23, information indicative of the data that can be restored by using the data and parity stored in the storage device 1 in the on state is stored.

In the off-load information 23, data identifiers and times are stored in association with each other.

The data identifier is information for identifying data.

The time indicates the time at which the data identifier belonging to the same record was stored in the storage device 1.

With reference to the off-load information 23 illustrated in FIG. 11B, information indicated by the record stored in the off-load information 23 is explained in detail.

The off-load information 23 indicates that the data D1 that was stored at the time t1 in the storage device 1 has been turned into off-loaded data in the case where the data identifier d1 and the time t1 are stored in association with each other, as illustrated in FIG. 11B.

Explanation is given with reference to FIG. 8.

For example, the transmission unit 31 transmits data, parity, and requests output from the control unit 10 to the storage device 1 and the other information processing devices.

For example, the reception unit 32 receives data, parity, and requests transmitted from the terminal 10, the information processing devices 50 to 70, and the storage device 1. Then, the reception unit 32 inputs the received data, parity, and requests to the control unit 10.

Figure 12:
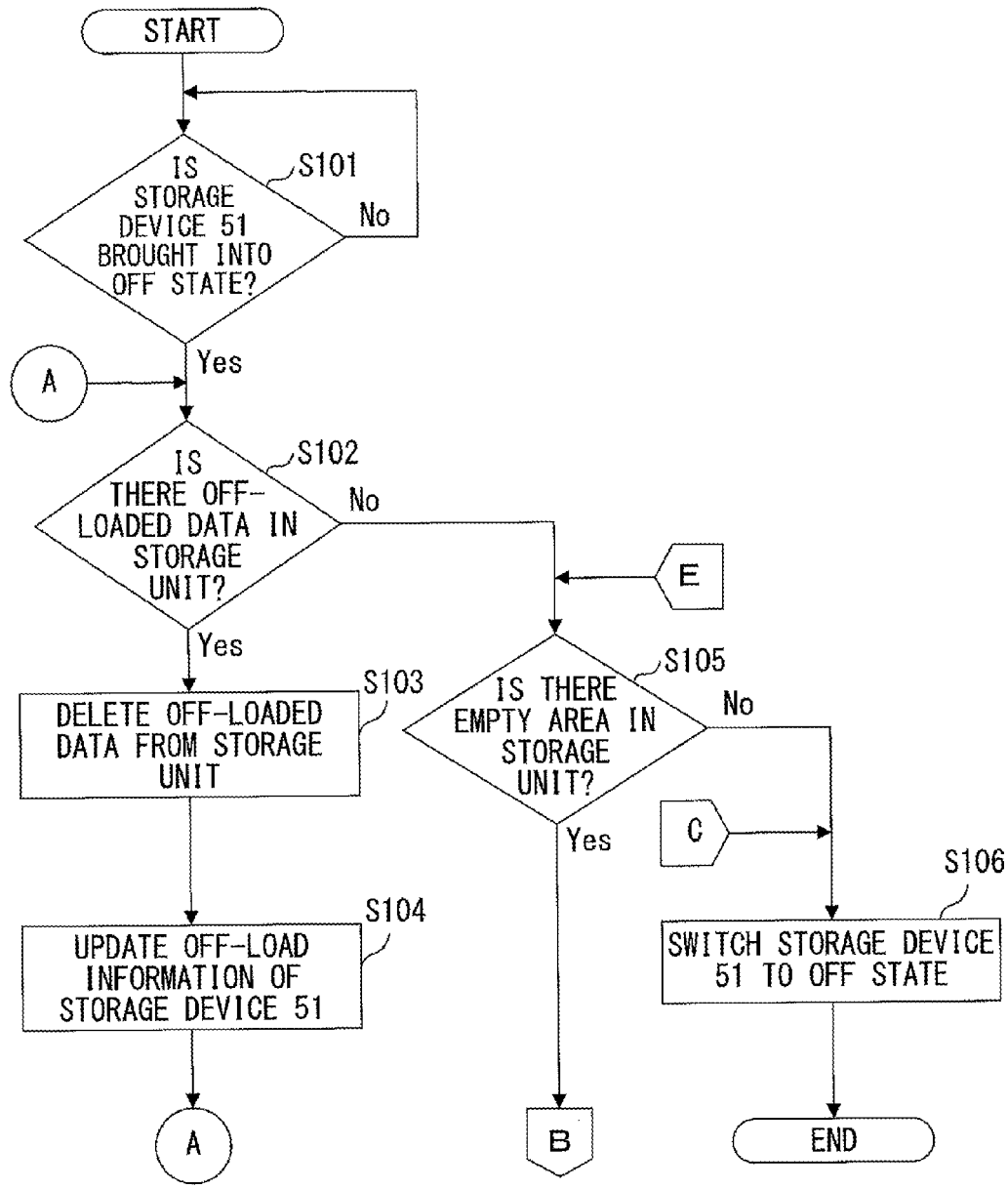
FIG. 12 is a flowchart (part 1) illustrating processing to switch the storage device to an off state.
Figure 13:
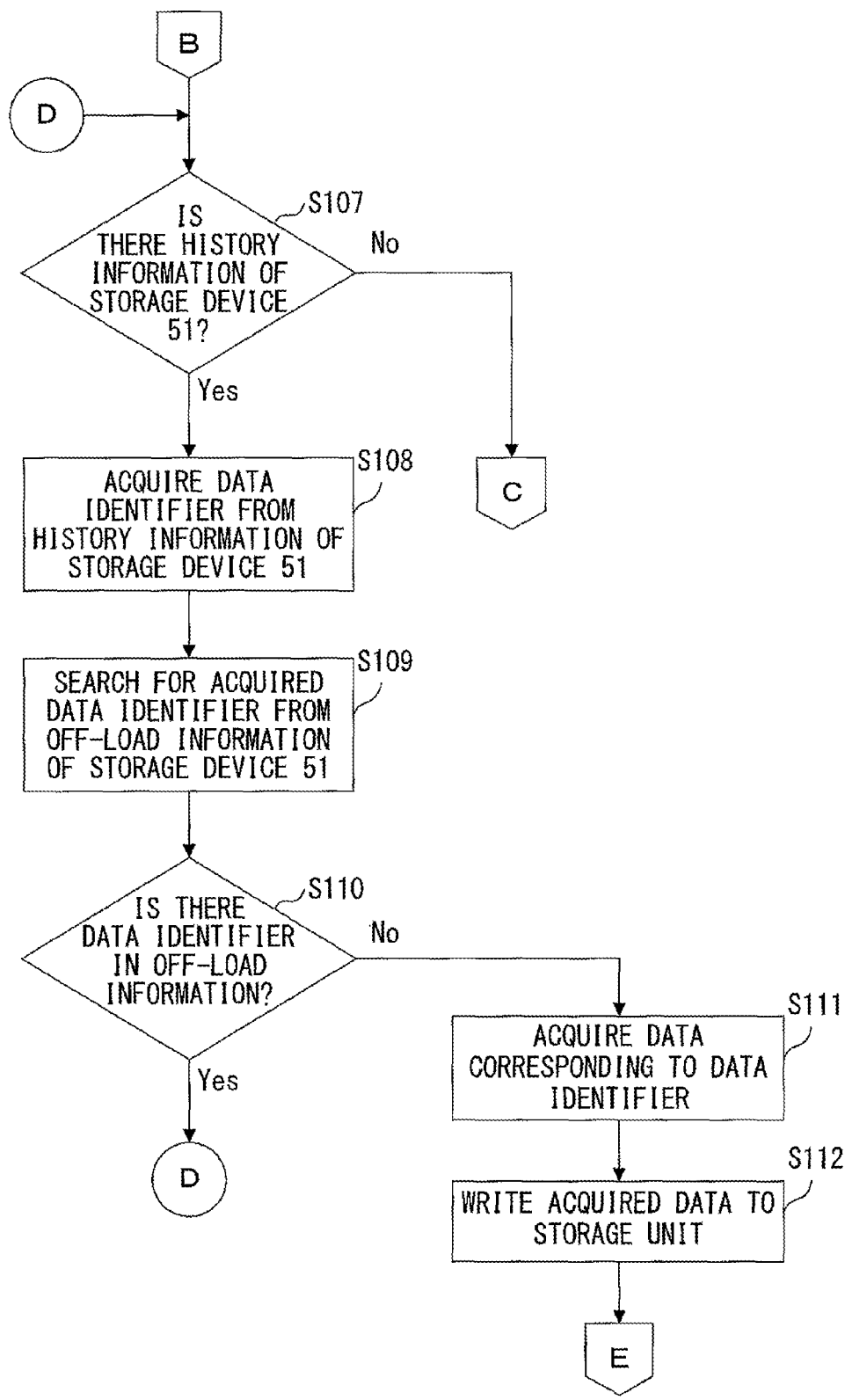
FIG. 13 is a flowchart (part 2) illustrating the processing to switch the storage device to the off state.

FIG. 12 and FIG. 13 are a flowchart illustrating processing to switch a disk to the off state.

With reference to FIG. 12 and FIG. 13, processing when the data storage device 1 is switched from the on state to the off state for further reducing power consumption in the case where the parity storage device 1 is in the off state in the distributed storage system 100 is explained. In the following explanation, explanation is given by using processing to switch the storage device 51 from the on state to the off state in the case where the parity storage device 1 is in the off state as an example. Further, it is assumed that the processing performed by the information processing device 50 is performed by the control unit 10 of the information processing device 50.

The information processing device 50 determines whether or not to bring the storage device 51 into the off state (S101). In the case where the information processing device 50 does not bring the storage device 51 into the off state (No at S101), the processing at S101 is repeated. The information processing device 50 starts the processing to switch the storage device 51 to the off state when, for example, a request to bring the storage device 51 into the off state is given by a user, or an algorithm determines that the storage device 51 is to be brought into the off state (Yes at S101).

After starting the processing to switch the storage device 51 to the off state (Yes at S101), the information processing device 50 determines whether or not there is off-loaded data of the storage device 1 in the held information 21 stored in the storage unit 20 (S102).

In the case where there is off-loaded data in the held information 21 stored in the storage unit 20 (Yes at S102), the information processing device 50 deletes the off-loaded data from the held information 21 stored in the storage unit 20 (S103). At this time, it may also be possible for the information processing device 50 to delete all the pieces of off-loaded data from the held information 21 stored in the storage unit 20.

Further, the information processing device 50 updates the off-load information 23 of the storage device 51 stored in the storage unit 20 (S104). Then, the information processing device 50 performs the processing at S102. In other words, the information processing device 50 stores the data identifier of the data that has been deleted from the held information 21 in the off-load information 23 of the storage device 51 stored in the storage unit 20 by regarding the data that has been deleted from the held information 21 stored in the storage unit 20 at S103 as off-loaded data.

In the case where the information processing device 50 has determined that there is not off-loaded data in the held information 21 stored in the storage unit 20 at S102 (No at S102), the information processing device 50 determines whether or not there is an empty area in the storage area for storing the held information 21 of the storage unit 20 (S105).

In the case where there is not an empty area in the storage area for storing the held information 21 of the storage unit 20 (No at S105), the information processing device 50 switches the storage device 51 to the off state (S106). Then, the information processing device 50 terminates the processing to switch the storage device 51 to the off state.

In the case where there is an empty area in the storage area for storing the held information 21 of the storage unit 20 (Yes at S105), the information processing device 50 performs the processing at S107.

Explanation is given with reference to FIG. 13.

The information processing device 50 determines whether or not a deletion history is stored in the history information 22 of the storage device 51 stored in the storage unit 20 (S107). In the case where there is not a deletion history in the history information 22 of the storage device 51 stored in the storage unit 20 (No at S107), the information processing device 50 performs the processing at S106.

In the case where there is a deletion history in the history information 22 of the storage device 51 stored in the storage unit 20 (Yes at S107), the information processing device 50 acquires a data identifier from the history information 22 of the storage device 51 stored in the storage unit 20 (S108). At this time, it may also be possible for the information processing device 50 to refer to the time of the deletion history stored in the history information 22 of the storage device 51 stored in the storage unit 20 and to acquire the data identifier of the data that has been deleted recently (the data identifier that has been stored in the history information 22 recently). It is assumed that the information processing device 50 determines whether or not a deletion history other than the deletion history that was referred to by the previous time is stored in the history information 22 stored in the storage unit 20 at S107.

Then, the information processing device 50 searches the off-load information 23 of the storage device 51 stored in the storage unit 20 to determine whether or not the data identifier that has been acquired at S108 is included therein (S109).

In the case where the data identifier that has been acquired at S108 is included in the off-load information 23 of the storage device 51 stored in the storage unit 20 (Yes at S110), the information processing device 50 performs the processing at S107. At this time, the information processing device 50 determines whether or not a deletion history other than the deletion history that was referred to by the previous time is stored at S107.

In the case where the data identifier that has been acquired at S108 is not included in the off-load information 23 of the storage device 51 stored in the storage unit 20 (No at S110), the information processing device 50 acquires data corresponding to the data identifier from the storage device 51 (S111). The fact that the data identifier that has been acquired at S108 is not included in the off-load information 23 indicates that the data that is identified by the acquired data identifier is not off-loaded data. In other words, the fact that the data identifier that has been acquired at S108 is not included in the off-load information 23 indicates that the data that is identified by the acquired data identifier is data that will not be restored.

Then, the information processing device 50 writes the data acquired at S111 to the held information 21 stored in the storage unit 20 (S112). Then, the information processing device 50 performs the processing at S105.

As above, when bringing the storage device 51 into the off state, the information processing device 50 writes the data that will not be restored to the held information 21 stored in the storage unit 20. Because of this, when a request to read the data that has been stored in the storage device 51 and which will not be restored is given in the case where the storage device 51 is in the off state, the information processing device 50 reads the data that has been stored in the storage unit 20 and which will not restored. Further, when a request to read off-loaded data is given in the state where the storage device 51 is in the off state, the information processing device 50 acquires data that can be restored by using the data and parity that were distributed and stored in the other storage device 1 that is in the on state and reads the acquired data. Consequently, it is possible for the information processing device 50 to read the data stored in the storage device 51 without bringing the parity storage device 1 into the on state even in the case where the storage device 51 is in the off state.

Figure 14:
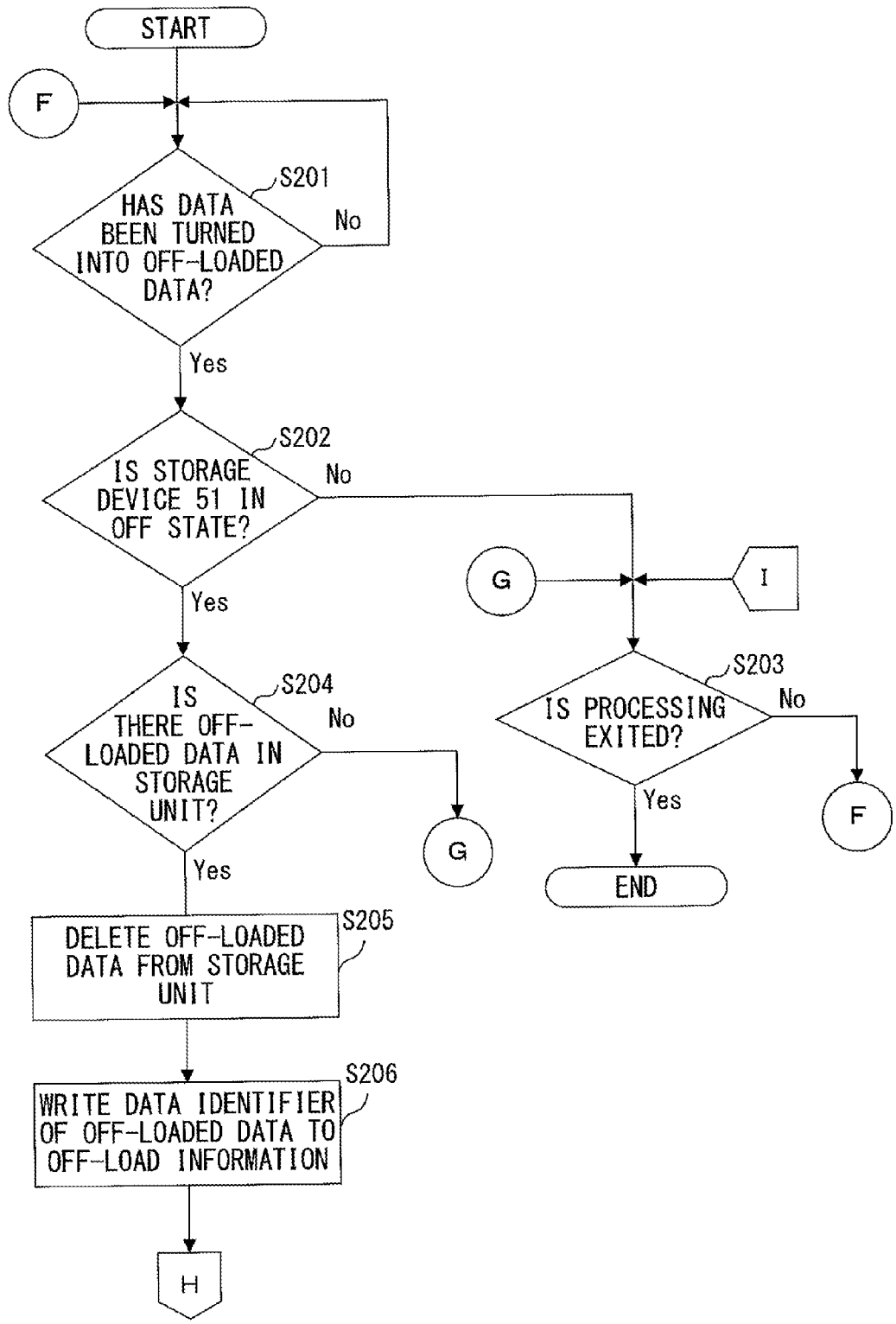
FIG. 14 is a flowchart (part 1) illustrating processing after data has been turned into off-loaded data.
Figure 15:
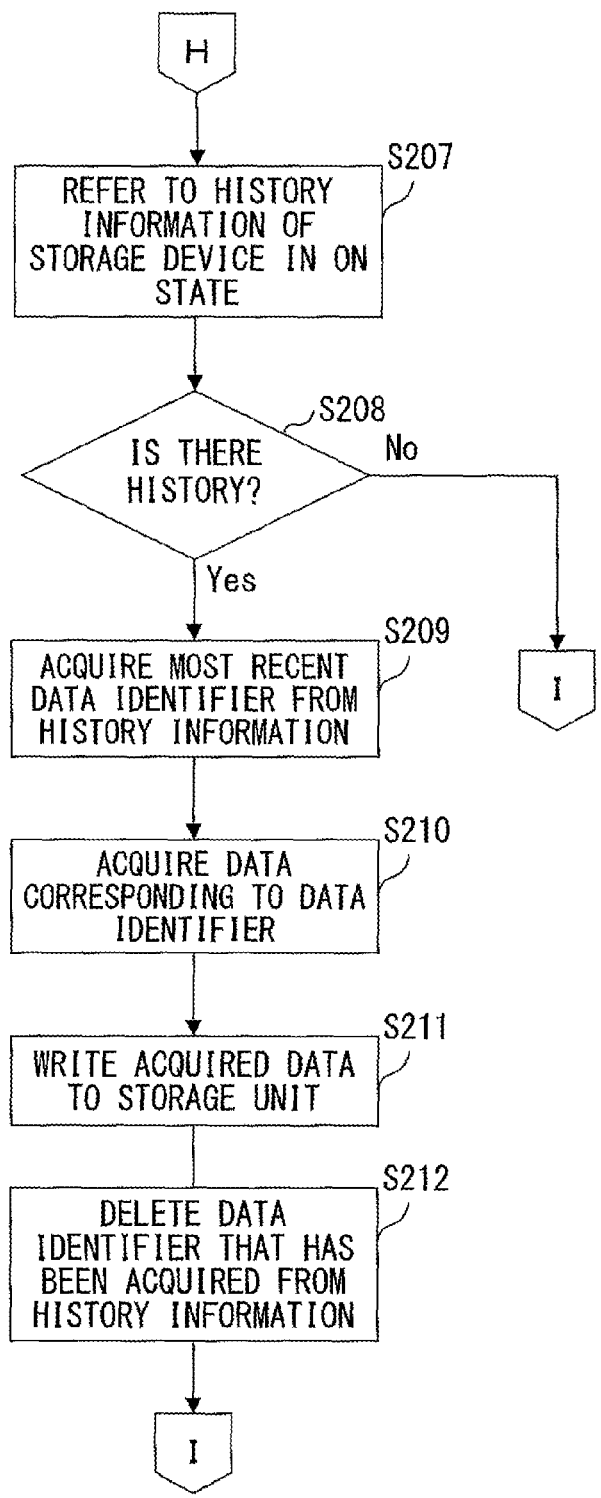
FIG. 15 is a flowchart (part 2) illustrating the processing after data has been turned into off-loaded data.

FIG. 14 and FIG. 15 are a flowchart illustrating processing after data has been turned into off-loaded data.

With reference to FIG. 14 and FIG. 15, processing after the data of the storage device 1 stored in the storage unit 20 of the information processing device has been turned into off-loaded data in the case where the data storage device 1 is kept in the off state in the distributed storage system 100 is explained. In the following explanation, explanation is given by using processing after the data of the storage device 51 stored in the storage unit 20 of the information processing device 50 has been turned into off-loaded data in the case where the storage device 51 is in the off state as an example. Further, it is assumed that the processing performed by the information processing device 50 is performed by the control unit 10 of the information processing device 50.

The information processing device 50 determines whether or not the data of the storage device 51 stored in the storage unit 20 has been turned into off-loaded data (S201). The information processing device 50 performs the processing at S201 repeatedly until the data of the storage device 51 stored in the storage unit 20 is turned into off-loaded data (No at S201).

The information processing device 50 determines whether or not the storage device 51 is in the off state after the data of the storage device 51 stored in the storage unit 20 has been turned into off-loaded data (S202). In the case where the storage device 51 is in the on state (No at S202), the information processing device 50 determines whether or not to terminate the processing after the data of the storage device 51 has been turned into off-loaded data (S203).

In the case where the information processing device 50 has determined that the processing after the data has been turned into off-loaded data is not to be terminated (No at S203), the information processing device 50 performs the processing at S201. For example, when a request to terminate the processing is given by a user, the information processing device 50 determines that the processing after data has been turned into off-loaded data is to be terminated (Yes at S203) and terminates the processing after data has been turned into off-loaded data. It may also be possible for the information processing device 50, outside of step S203, to terminate the processing after data has been turned into off-loaded data when a request to terminate the processing is given by a user.

In the case where the storage device 51 is in the off state (Yes at S202), the information processing device 50 determines whether or not the data that has been turned into off-loaded data at S201 exists in the held information 21 stored in the storage unit 20 (S204). In the case where the data that has been turned into off-loaded data at S201 does not exist in the storage unit 20 (No at S204), the information processing device 50 performs the processing at S203.

In the case where the data that has been turned into off-loaded data at S201 exists in the held information 21 stored in the storage unit 20 (Yes at S204), the information processing device 50 deletes the off-loaded data from the held information 21 stored in the storage unit 20 (S205).

The information processing device 50 writes the data identifier of the data that has been turned into off-loaded data at S201 to the off-load information 23 of the storage device 51 stored in the storage unit 20 (S206). Then, the information processing device 50 performs the processing at S207.

Explanation is given with reference to FIG. 15.

The information processing device 50 refers to the history information 22 of the storage device 1 that is in the on state stored in the storage unit 20 (S207).

In the case where there is not a deletion history in the history information 22 of the storage device 1 that is in the on state stored in the storage unit 20 (No at S208), the information processing device 50 performs the processing at S203.

In the case where there is a deletion history in the history information 22 of the storage device 1 that is in the on state stored in the storage unit 20 (Yes at S208), the information processing device 50 acquires the data identifier associated with the most recent time from the deletion history stored in the history information 22 (S209).

The information processing device 50 acquires the data corresponding to the data identifier acquired at S209 from the storage device 1 that is in the on state (S210).

The information processing device 50 writes the acquired data to the held information 21 stored in the storage unit 20 (S211).

The information processing device 50 deletes the data identifier acquired from the history information 22 (S212). Then, the information processing device 50 performs the processing at S203.

Figure 16:
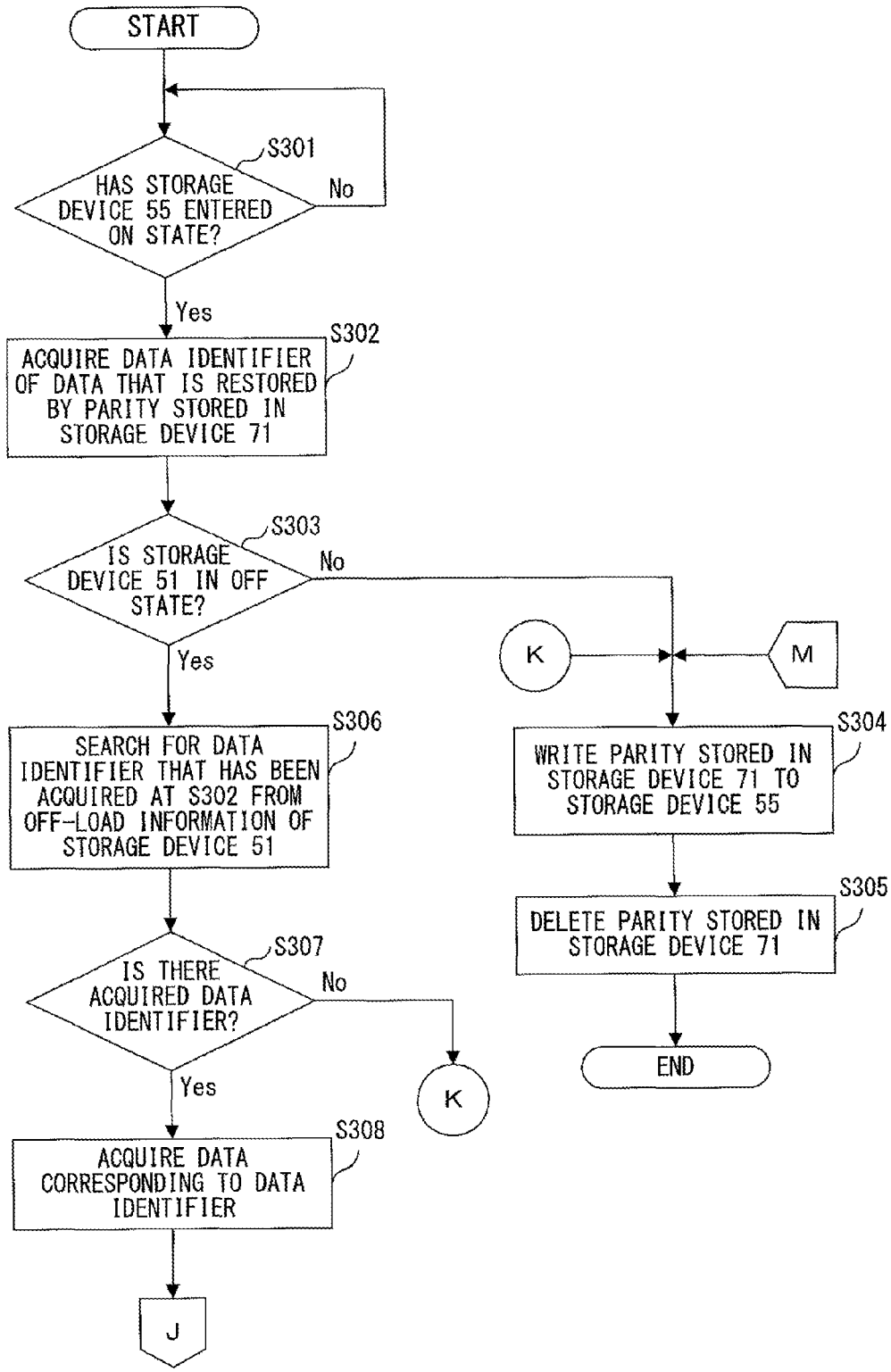
FIG. 16 is a flowchart (part 1) illustrating processing after the parity storage device has entered an on state.
Figure 17:
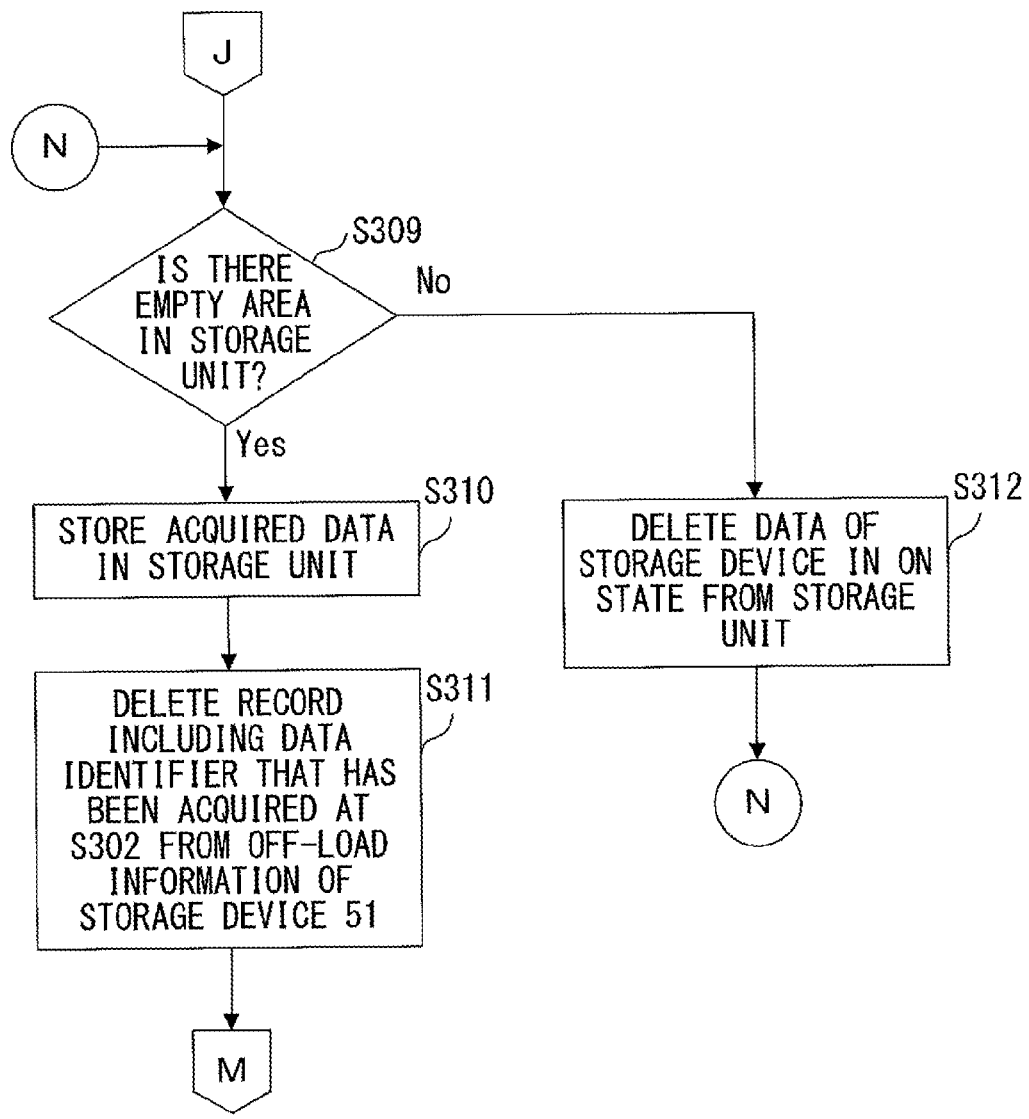
FIG. 17 is a flowchart (part 2) illustrating the processing after the parity storage device has entered the on state.

FIG. 16 and FIG. 17 are a flowchart illustrating processing after the parity storage device has entered the on state.

With reference to FIG. 16 and FIG. 17, processing after the parity storage device 1 that was kept in the off state has entered the on state in the distributed storage system 100 is explained. In the following explanation, explanation is given by using processing when the parity storage device 55 switches from the on state to the off state as an example. It is assumed that the processing performed by the information processing device 50 is performed by the control unit 10 of the information processing device 50.

The information processing device 50 determines whether or not the storage device 55 has entered the on state (S301). It may also be possible for the switching unit 13 of the information processing device 50 to bring the parity storage device 1 into the on state when, for example, the empty area of the other storage device 1 that is in the on state becomes lower than a predetermined amount. Further, it may also be possible for the switching unit 13 of the information processing device 50 to bring the parity storage device 1 into the on state at each predetermined time. Furthermore, the processing to turn on the parity storage device 1 may be performed by another information processing device.

The information processing device 50 performs the processing at S301 repeatedly until the storage device 55 enters the on state (No at S301).

When the storage device 55 enters the on state (Yes at S301), the information processing device 50 acquires the data identifier of the data that is restored by the parity stored in the storage device 71 (S302).

The information processing device 50 determines whether or not the storage device 51 is in the off state (S303). In the case where the storage device 51 is in the on state (No at S303), the information processing device 50 writes the parity stored in the storage device 71 to the storage device 55 (S304).

Further, the information processing device 50 deletes the parity stored in the storage device 71 (S305). Then, the information processing device 50 terminates the processing after the parity storage device 1 has entered the on state.

In the case where the storage device 51 is in the off state at S303 (Yes at S303), the information processing device 50 searches for the data identifier acquired at S302 from the off-load information of the storage device 51 (S306).

In the case where the data identifier acquired at S302 exists in the off-load information of the storage device (Yes at S307), the information processing device 50 acquires the data corresponding to the data identifier (S308). Then, the information processing device 50 performs the processing at S309.

Explanation is given with reference to FIG. 17.

The information processing device 50 determines whether or not there is an empty area in the storage area for storing the held information 21 of the storage unit 20 (S309).

In the case where there is an empty area in the storage area for storing the held information 21 of the storage unit 20 (Yes at S309), the information processing device 50 stores the data acquired at S306 in the held information 21 stored in the storage unit 20 (S310).

The information processing device 50 deletes the record including the data identifier acquired at S302 from the off-load information 23 of the storage device 51 (S311). Then, the information processing device 50 performs the processing at S304.

In the case where there is not an empty area in the storage area of the held information 21 of the storage unit 20 at S309 (No at S309), the information processing device 50 deletes the data of the storage device 1 that is in the on state from the storage unit 20. Then, the information processing device 50 performs the processing at S309.

Figure 18:
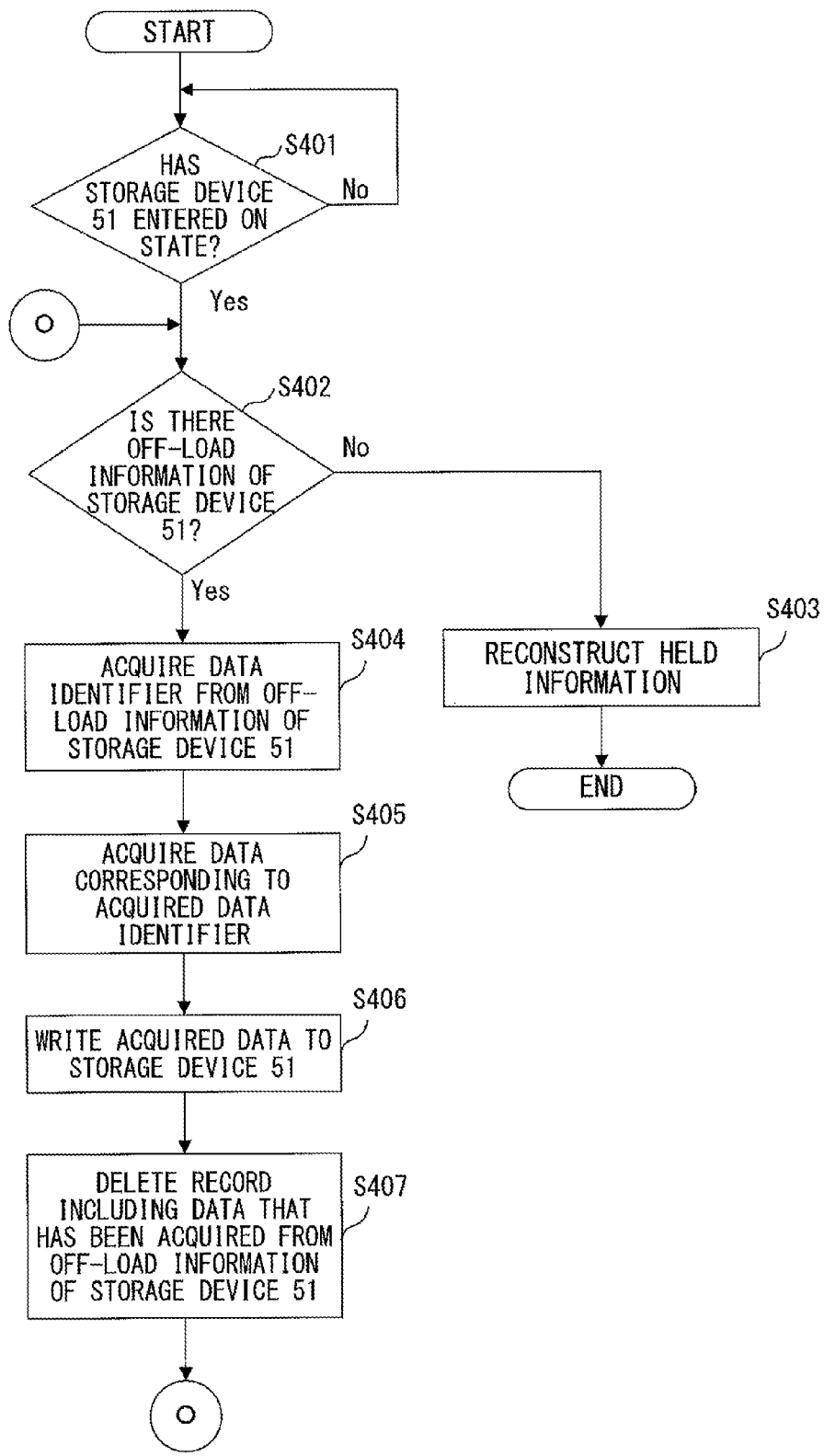
FIG. 18 is a flowchart illustrating processing after the data storage device has changed from the off state into the on state.

FIG. 18 is a flowchart illustrating processing after the data storage device has changed from the off state into the on state.

With reference to FIG. 18, processing after the data storage device 1 that was kept in the off state has entered the on state in the distributed storage system 100 is explained. In the following explanation, explanation is given by using processing when the data storage device 51 switches from the off state to the on state as an example. Further, it is assumed that the processing that is performed by the information processing device 50 is performed by the control unit 10 of the information processing device 50.

The information processing device 50 determines whether or not the storage device 51 has entered the on state (S401). It may also be possible for the switching unit 13 of the information processing device 50 to bring the data storage device 1 into the on state when the empty area of the other storage device 1 that is in the on state becomes lower than a predetermined amount. Further, the processing to turn on the data storage device 1 may be performed by another information processing device.

The information processing device 50 performs the processing at S401 repeatedly until the storage device 51 enters the on state (No at S401).

When the storage device 51 enters the on state (Yes at S401), the information processing device 50 determines whether or not information indicative of off-loaded data is stored in the off-load information 23 of the storage device 51 stored in the storage unit 20 (S402).

In the case where information indicative of off-loaded data is not stored in the off-load information 23 of the storage device 51 stored in the storage unit 20 (No at S402), the information processing device 50 reconstructs the held information 21 (S403). Reconstructing the held information 21 is processing to replace data with data whose use frequency is high in the held information 21 by using, for example, the already-existing Cache Replacement Algorithm, such as the LRU (Least Recently Used).

In the case where information indicative of off-loaded data is stored in the off-load information 23 of the storage device 51 stored in the storage unit 20 (Yes at S402), the information processing device 50 acquires the data identifier from the off-load information 23 of the storage device 51 (S404).

Then, the information processing device 50 acquires the data corresponding to the acquired data identifier (S405).

The information processing device 50 writes the acquired data to the storage device 51 (S406). Then, it may also be possible for the information processing device 50 to delete the acquired data stored in another storage device 1.

The information processing device 50 deletes the record including the data acquired from the off-load information 23 of the storage device 51 (S407).

Then, the information processing device 50 performs the processing at S402.

Figure 19:
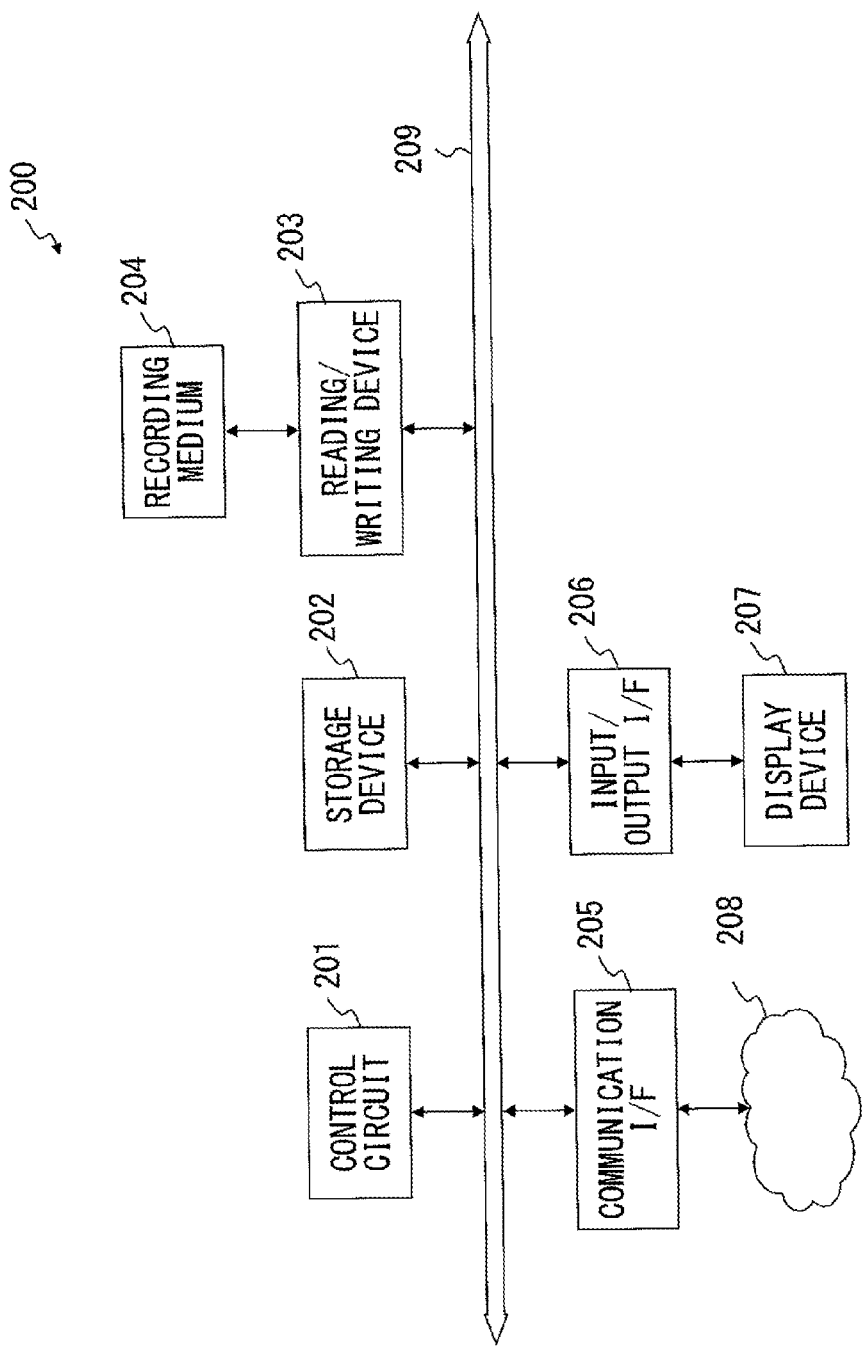
FIG. 19 is a block diagram illustrating one embodiment of a computer device.

With reference to FIG. 19, the configuration of the information processing devices 40 to 70 is explained.

In FIG. 19, a computer device 200 includes a control circuit 201, a storage device 202, a reading/writing device 203, a recording medium 204, a communication interface 205 (communication I/F), an input/output interface 206 (input/output IF), a display device 207, and a network 208. Further, each component is connected by a bus 209.

The control unit 201 controls the whole of the computer device 200. The control circuit 201 is, for example, a processor, such as a CPU, a multi-core CPU, an FPGA (Field Programmable Gate Array), and a PLD (Programmable Logic Device). The control circuit 201 functions, for example, as the control unit 41 in FIG. 2. Further, the control circuit 201 functions as, for example, the control unit 10 in FIG. 8. In FIG. 2, the data management information 24 and the parity management information 25 stored in the storage unit 42 may be stored in, for example, the cache of a CPU, an FPGA, and a PLD. Further, in FIG. 8, the held information 21, the history information 22, and the off-load information 23 stored in the storage unit 20 may be stored in, for example, the cache of a CPU, an FPGA, and a PLD.

The storage device 202 stores various kinds of data. Then, the storage device 202 is, for example, a memory, such as a ROM (Read Only Memory) and a RAM (Random Access Memory) or a non-transitory computer-readable recording medium such as an HD. The storage device 202 functions as, for example, the storage unit 42 in FIG. 2. Further, the storage device 202 functions as, for example, the storage unit 20 in FIG. 8.

The ROM stores programs such as a boot program. The RAM is used as a work area of the control circuit 201. The HD stores programs, such as an OS, application programs, and firmware, and various kinds of data.

The storage device 202 stores, for example, storage device control programs that cause the control circuit 201 to function as the control unit 10 and the control unit 41.

When controlling the storage device, the information processing devices 40 to 70 read the storage device control programs stored in the storage device 202 onto the RAM. By the control circuit 201 executing the storage device control programs that have been read onto the RAM, the information processing devices 40 to 70 perform storage device control processing including one or more of the generation processing, the allocation processing, the management processing, the deletion processing, the writing processing, the switching processing, the reading processing, and the acquisition processing.

The storage device control programs may be stored in a storage device possessed by the server on the network 208 as long as the control circuit 201 can access the storage device control programs via the communication interface 205.

The reading/writing device 203 is controlled by the control circuit 201 and reads and writes data of the recording medium 204 that can be attached and detached. The reading/writing device 203 is, for example, an FDD (Floppy Disk Drive), a CDD (Compact Disc Drive), a DVDD (Digital Versatile Disk Drive), a BDD (Blu-ray (registered trademark) Disk Drive), a USB (Universal Serial Bus), etc.

The recording medium 204 saves various kinds of data. The recording medium 204 stores, for example, storage device control programs. Further, it may also be possible for the recording medium 204 to store the data management information 24 and the parity management information 25 illustrated in FIG. 2. Furthermore, it may also be possible for the recording medium 204 to store the held information 21, the history information 22, and the off-load information 23 illustrated in FIG. 8.

Then, the recording medium 204 is connected to the bus 209 via the reading/writing device 203 and the data is read and written by the control circuit 201 controlling the reading/writing device 203. The recording medium 204 is, for example, a non-transitory computer-readable recording medium, such as an FD (Floppy Disk), a CD (Compact Disc), a DVD (Digital Versatile Disk), a BD (Blu-ray Disk: registered trademark), and a flash memory.

The communication interface 205 connects the computer device 200 and another device so as to be capable of communication via the network 208. Then, the communication interface 205 functions as, for example, the transmission/reception unit 43 in FIG. 2. Further, the communication interface 205 functions as, for example, the transmission/reception unit 30 in FIG. 8.

The input/output interface 206 is connected to, for example, a keyboard, a mouse, a touch panel, etc., and when a signal indicating various kinds of information is input from a device that is connected, the input/output interface 206 outputs the signal that has been input via the bus 209 to the control circuit 201. Further, when a signal indicating various kinds of information output from the control circuit 201 is input via the bus 209, the input/output interface 206 outputs the signal to the various kinds of devices that are connected. For example, it may also be possible for the input/output interface 206 to receive a request input by a user to bring the storage device 1 into the off state.

The display device 207 is connected to, for example, the input/output interface 206 and displays various kinds of information.

The network 208 is, for example, a LAN, a wireless communication network, or the Internet, etc., and connects the computer device 200 and another device so as to be capable of communication.

As above, in the distributed storage system of the embodiment, when the data storage device 1 is brought into the off state, the information processing device deletes off-loaded data from the storage unit 20 and stores data that will not be restored in the storage unit 20. Then, when a request to read data stored in the storage device 1 that is in the off state is given, the information processing device outputs the data stored in the storage device 1 that is in the off state from the storage unit 20 without turning on the power source of the storage device 1 that is in the off state. Because of this, it is possible for the distributed storage system 100 of the embodiment to maintain the off state of the data storage device 1 and to reduce power consumption during its operation.

Further, in the distributed storage system 100 of the embodiment, when a request to read off-loaded data is given in the state where the data storage device 1 is in the off state, the information processing device acquires data and parity stored in another storage device 1. Then, the information processing device restores the off-loaded data by using the acquired data and parity without turning on the power source of the storage device 1 that is in the off state and outputs the restored data. Because of this, it is possible for the distributed storage system 100 of the embodiment to maintain the off state of the data storage device 1 and to reduce power consumption during its operation.

Furthermore, in the distributed storage system 100 of the embodiment, when writing data that will not be restored to the storage unit 20, the information processing system writes data whose possibility of being used is high and makes higher the possibility that the data that has been requested to be read will be stored in the storage unit 20. Because of this, in the distributed storage system 100 of the embodiment, the probability is reduced that the storage device 1 that is in the off state will be brought into the on state because there is no data on the storage unit 20 when data is read. Consequently, in the distributed storage system 100 of the embodiment, the probability that the off state of the data storage device 1 will be maintained is increased and therefore it is possible to further reduce power consumption.

In the distributed storage system 100 of the embodiment, when there is new off-loaded data in the data stored in the data storage device 1 in the case where the data storage device 1 is in the off state, the information processing system deletes the data from the storage unit 20. Then, the information processing device writes the data whose possibility of being used is high in the history information 22 of the storage device 1 that is in the on state to the storage unit 20. Because of this, it is possible to improve the processing speed for a request because in the distributed storage system 100 of the embodiment, the data whose possibility of being used is as high as possible is stored while the off state of the data storage device 1 is maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A distributed storage system, comprising:
a plurality of storage devices; and
an information processing device; wherein
the information processing device includes:
  a cache; and
  a processor that executes a process including
    deleting first data from the cache, when the first data is stored in the cache and a first storage device of the plurality of storage devices, and the first data being capable of being restored by using second data and a parity, the second data and the parity being distributed and stored in a second storage device of the plurality of storage devices that is in the power-on state,
    writing third data to the cache, the third data being stored in the first storage device and being not restored even by using the second data and the parity that are distributed and stored in the second storage device that is in the power-on state,
    switching the first storage device to the power-off state after writing the third data to the cache, and
    reading the third data that has been stored in the cache when a request to read the third data is given when the first storage device is in the power-off state.

2. The distributed storage system according to claim 1, wherein the process executed by the processor further including
acquiring the first data that can be restored by using the second data and the parity that are distributed and stored in the second storage device that is in the power-on state when a request to read the first data is given when the first storage device is in the power-off state, and
the reading processing that is performed by the processor further includes processing to read the first data acquired by the acquiring processing.

3. The distributed storage system according to claim 1, wherein the writing processing that is performed by the processor further includes processing to write data having a high possibility of being used to the cache when writing the third data to the cache.

4. The distributed storage system according to claim 1, wherein
the writing processing that is performed by the processor further includes processing to write the third data to the second storage device that is in the power-on state when a request to update the third data that has been stored in the first storage device is given when the first storage device is in the power-off state, and further includes processing to write data having a high possibility of being used from among fourth data stored in a third storage device of the plurality of storage devices that is in the power-on state to the cache after the third data that has been stored in the cache is deleted,
the deletion processing that is performed by the processor further includes processing to delete the third data before updating that has been stored in the cache after the third data is written to the second storage device in the power-on state, and
the reading processing that is performed by the processor further includes processing to read the third data that has been stored in the second storage device when a request to read the third data is given when the first storage device is in the power-off state and the third data has been written to the second storage device.

5. The distributed storage system according to claim 1, wherein the process executed by the processor further including
acquiring the first data that is identified by a data identifier stored in the cache when a third storage device of the plurality of storage devices enters the power-on state when the first storage device is in the power-off state,
the writing processing that is performed by the processor further includes processing to write the data identifier of the first data to the cache after the first data is deleted from the cache by the deleting processing, to write the acquired first data to the cache when the first data is acquired by the acquiring processing, and to write the parity stored in second storage device in the power-on state to the third storage device,
the switching processing that is performed by processor further includes processing to switch the third storage device to the power-off state after the parity stored in second storage device that is in the power-on state is written to the third storage device,
the deleting processing that is performed by the processor further includes processing to delete the parity stored in second storage device that is in the power-on state from the second storage device after the third storage device is switched to the power-off state, and
the reading processing that is performed by the processor further includes processing to read the first data that has been stored in the cache when a request to read the first data that has been acquired is given.

6. The distributed storage system according to claim 1, wherein
the deleting processing that is performed by the processor further includes processing to delete the third data from the cache after the first storage device enters the power-on state, and
the writing processing that is performed by the processor further includes processing to write data having a high possibility of being used from among fourth data stored in a third storage device of the plurality of storage devices that is in the power-on state to the cache.

7. The distributed storage system according to claim 5, wherein
the writing processing that is performed by the processor includes processing to write the parity and the third data to an empty area of the second storage device that is in the power-on state, and
the switching processing that is performed by the processor includes processing to switch the third storage device to the power-on state when the empty area of the second storage device that is in the power-on state becomes lower than a predetermined amount.

8. The distributed storage system according to claim 1, wherein
the writing processing that is performed by the processor includes processing to write the parity and the third data to an empty area of the second storage device that is in the power-on state, and to write the third data that has been stored in the second storage device that is in the power-on state to the first storage device after the first storage device enters the power-on state,
the switching processing that is performed by the processor includes processing to switch the first storage device to the power-on state when the empty area of the second storage device that is in the power-on state becomes lower than a predetermined amount, and
the deleting processing that is performed by the processor includes processing to delete the third data that has been stored in the second storage device that is in the power-on state when the first storage device has entered the power-on state and when the third data has been written to the first storage device.

9. The distributed storage system according to claim 1, wherein the information processing device or the other information processing devices includes the cache or the processor or any combination thereof.

10. A storage device control method that is performed by a processor of an information processing device including a cache and connected to a plurality of storage devices so as to be capable of communication, the storage device control method comprising:
a process that is performed by the processor including
deleting first data from the cache, when the first data is stored in the cache and a first storage device of the plurality of storage devices, and the first data being capable of being restored by using second data and a parity, the second data and the parity being distributed and stored in a second storage device of the plurality of storage devices that is in the power-on state,
writing third data to the cache, the third data being stored in the first storage device and being not restored even by using the second data and the parity that are distributed and stored in the second storage device that is in the power-on state;
switching the first storage device into the power-off state; and
reading the third data that has been stored in the cache when a request to read the third data is given when the first storage device is in the power-off state.

11. The storage device control method according to claim 10, wherein the process that is performed by the processor further including
acquiring the first data that can be restored by using the second data and the parity that are distributed and stored in the second storage device that is in the power-on state when a request to read the first data is given when the first storage device is in the power-off state; and
reading the acquired first data.

12. The storage device control method according to claim 10, wherein the process that is performed by the processor further including writing data having a high possibility of being used to the cache in the processing to write the third data to the cache.

13. A non-transitory computer-readable recording medium storing programs for causing a processor of an information processing device including a cache and connected to a plurality of storage devices so as to be capable of communication, to perform storage device control process, the storage device control process comprising:
a process that is performed by the processor including
deleting first data from the cache, when the first data is stored in the cache and a first storage device of the plurality of storage devices, and the first data being capable of being restored by using second data and a parity, the second data and the parity being distributed and stored in a second storage device of the plurality of storage devices that is in the power-on state,
writing third data to the cache, the third data being stored in the first storage device and being not restored by using the second data and the parity that are distributed and stored in the second storage device that is in the power-on state;
switching the first storage device into the power-off state; and reading the third data that has been stored in the cache when a request to read the third data is given when the first storage device is in the power-off state.

14. The non-transitory computer-readable recording medium according to claim 13, wherein the process that is performed by the processor further including acquiring the first data that can be restored by using the second data and the parity that are distributed and stored in the second storage device that is in the power-on state when a request to read the first data is given in the state when the first storage device is in the power-off state; and reading the acquired first data.

15. The non-transitory computer-readable recording medium according to claim 13, wherein the process that is performed by the processor further including writing data having a high possibility of being used to the cache in the processing to write the third data to the cache.

* * * * *